(12) United States Patent
Fedurco et al.

(10) Patent No.: US 11,247,510 B2
(45) Date of Patent: *Feb. 15, 2022

(54) METALLIC OR METALLIZED REINFORCEMENT, THE SURFACE OF WHICH IS COATED WITH A POLYBENZOXAZINE

(71) Applicant: COMPAGNIE GENERALE DES ETABLISSEMENTS MICHELIN, Clermont-Ferrand (FR)

(72) Inventors: Milan Fedurco, Clermont-Ferrand (FR); Marco Ribezzo, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 592 days.

This patent is subject to a terminal disclaimer.

(21) Appl. No.: 16/062,990

(22) PCT Filed: Dec. 5, 2016

(86) PCT No.: PCT/FR2016/053212
§ 371 (c)(1),
(2) Date: Jun. 15, 2018

(87) PCT Pub. No.: WO2017/103376
PCT Pub. Date: Jun. 22, 2017

(65) Prior Publication Data
US 2020/0290402 A1    Sep. 17, 2020

(30) Foreign Application Priority Data

Dec. 16, 2015 (FR) .................... 1562497

(51) Int. Cl.
*B05D 1/18* (2006.01)
*B60C 9/00* (2006.01)
(Continued)

(52) U.S. Cl.
CPC .............. *B60C 9/0007* (2013.01); *B05D 1/18* (2013.01); *B05D 1/38* (2013.01); *B05D 7/14* (2013.01);
(Continued)

(58) Field of Classification Search
CPC . B60C 9/0007; B60C 1/00; B60C 2009/0014; D07B 1/0666; D07B 1/0606;
(Continued)

(56) References Cited

U.S. PATENT DOCUMENTS

| | | |
|---|---|---|
| 5,543,516 A | 8/1996 | Ishida |
| 9,228,112 B2 | 1/2016 | Gorodisher et al. |

(Continued)

FOREIGN PATENT DOCUMENTS

| | | |
|---|---|---|
| JP | 2006-206616 A | 8/2006 |
| JP | 2010-265480 A | 11/2010 |

(Continued)

OTHER PUBLICATIONS

Y. Yagci et al., "Recent Advancement on Polybenzoxazine—A Newly Developed High Performance Thermoset", J. Polymer Science: Part A, Polymer Chemistry, vol. 47, pp. 5565-5576 (2009).

*Primary Examiner* — Callie E Shosho
*Assistant Examiner* — Bethany M Miller
(74) *Attorney, Agent, or Firm* — Venable LLP

(57) ABSTRACT

At least a metallic part of a metal or metallized reinforcer, at least the surface of which is at least partially metallic, is coated with a polybenzoxazine, the repeat units of which comprise at least one unit corresponding to the formulae (I) or (II):

(Continued)

Polymer P

Polymer P'

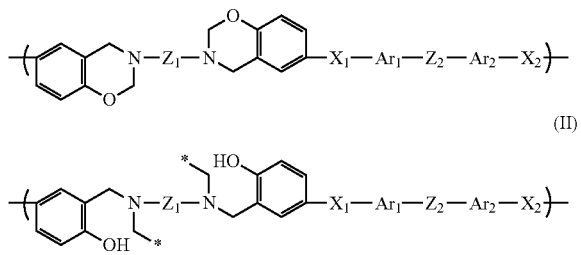

in which $Z_1$ represents an at least divalent, aliphatic, cycloaliphatic or aromatic bonding group comprising at least one carbon atom and optionally at least one heteroatom selected from O, S, N and P; $X_1$ and $X_2$, which are identical or different, represent O or S; $Ar_1$ and $Ar_2$, which are identical or different, represent a substituted or unsubstituted phenylene group; and $Z_2$ represents O or $(S)_n$, the symbol "n" representing an integer equal to 1 or greater than 1. Such a reinforcement can be used for the reinforcement of a rubber article, in particular a motor vehicle tyre.

24 Claims, 18 Drawing Sheets

(51) Int. Cl.
| | | |
|---|---|---|
| *B05D 1/38* | (2006.01) | |
| *B05D 7/14* | (2006.01) | |
| *C09J 161/34* | (2006.01) | |
| *C09J 181/02* | (2006.01) | |
| *D07B 1/06* | (2006.01) | |
| *B60C 1/00* | (2006.01) | |
| *B32B 5/02* | (2006.01) | |

(52) U.S. Cl.
CPC ........... *C09J 161/34* (2013.01); *C09J 181/02* (2013.01); *D07B 1/0666* (2013.01); *B05D 2202/15* (2013.01); *B32B 5/022* (2013.01); *B60C 1/00* (2013.01); *B60C 2009/0014* (2013.01); *D07B 1/0606* (2013.01)

(58) Field of Classification Search
CPC .... B32B 5/022; C08G 14/06; C08G 73/0233; C08G 73/06; C09J 179/02; C09J 161/34; C09J 181/02; C09J 179/04; B05D 5/10; B05D 1/18; B05D 1/38; B05D 7/14; B05D 2202/15; C09D 181/02
See application file for complete search history.

(56) References Cited

U.S. PATENT DOCUMENTS

| | | | |
|---|---|---|---|
| 9,499,666 B2 | 11/2016 | Ward et al. | |
| 9,617,372 B2 | 4/2017 | Fedurco et al. | |
| 9,845,376 B2 | 12/2017 | Fedurco et al. | |
| 10,549,580 B2* | 2/2020 | Fedurco | C09J 179/02 |
| 2004/0068084 A1 | 4/2004 | Hwang et al. | |
| 2007/0129509 A1 | 6/2007 | Li et al. | |
| 2009/0137434 A1* | 5/2009 | Kurihara | C08G 73/02 |
| | | | 508/246 |
| 2013/0209812 A1 | 8/2013 | Gorodisher et al. | |
| 2014/0044964 A1* | 2/2014 | Abad | B60C 9/005 |
| | | | 428/378 |
| 2014/0235124 A1 | 8/2014 | Doisneau et al. | |
| 2014/0235125 A1 | 8/2014 | Doisneau et al. | |
| 2014/0308864 A1 | 10/2014 | Doisneau et al. | |
| 2015/0259463 A1 | 9/2015 | Fedurco et al. | |
| 2015/0274878 A1 | 10/2015 | Fedurco et al. | |
| 2016/0122460 A1 | 5/2016 | Fedurco et al. | |
| 2016/0251550 A1 | 9/2016 | Michoud et al. | |
| 2018/0370284 A1 | 12/2018 | Fedurco et al. | |

FOREIGN PATENT DOCUMENTS

| | | |
|---|---|---|
| JP | 2015-511259 A | 4/2015 |
| JP | 2019-505619 A | 2/2019 |
| WO | 2013/017423 A1 | 2/2007 |
| WO | 2013/017421 A1 | 2/2013 |
| WO | 2013/148408 A1 | 10/2013 |
| WO | 2014/063963 A2 | 5/2014 |
| WO | 2014/063968 A1 | 5/2014 |
| WO | 2014/173838 A1 | 10/2014 |
| WO | 2014/173839 A1 | 10/2014 |
| WO | 2015/007641 A1 | 1/2015 |
| WO | 2015/007642 A1 | 1/2015 |
| WO | 2015/118041 A1 | 8/2015 |
| WO | 2015/118042 A1 | 8/2015 |
| WO | 2013/017422 A1 | 2/2017 |

* cited by examiner

Monomer M

Monomer M-1

(A-2)

Monomer M-2

Monomer M-3

Monomer M-4

Monomer M-5

Monomer M-6

Compound 1      Compound 2      Compound 3

(A-8)

Monomer M-8

Monomer M-8

METALLIC OR METALLIZED REINFORCEMENT, THE SURFACE OF WHICH IS COATED WITH A POLYBENZOXAZINE

1. FIELD OF THE INVENTION

The present invention relates to thermosetting resins, which can be used in particular in adhesive systems intended in particular for the adhesive bonding of metal to rubber.

The invention relates more particularly to the metallic or metallized reinforcers coated with polymers that can be used as adhesive layers in metal/rubber composites intended for the manufacture of rubber articles such as pneumatic or non-pneumatic tyres, for motor vehicles.

2. PRIOR ART

Metal/rubber composites, in particular for motor vehicle tyres, are well known. They are usually composed of a matrix made of rubber, generally diene rubber, which can be crosslinked with sulfur, comprising metal reinforcing elements (or "reinforcers") such as wires, films, tapes or cords made of carbon steel.

As they are subjected to very high stresses during the running of the tyres, especially to repeated actions of compression, bending or variation in curvature, these composites must, in a known way, satisfy a large number of sometimes contradictory technical criteria, such as uniformity, flexibility, flexural strength and compressive strength, tensile strength, wear resistance and corrosion resistance, and must maintain this performance at a very high level for as long as possible.

It is easily understood that the adhesive interphase between rubber and reinforcers plays a predominant role in the endurance of this performance. The conventional process for connecting the rubber compositions to carbon steel consists in coating the surface of the steel with brass (copper/zinc alloy), the bonding between the steel and the rubber matrix being provided by sulfurization of the brass during the vulcanization or curing of the rubber. In order to improve the adhesion, use is generally made, in addition, in these rubber compositions, of organic salts or metal complexes, such as cobalt salts, as adhesion-promoting additives.

In point of fact, it is known that the adhesion between the carbon steel and the rubber matrix is capable of weakening over time as a result of the gradual development of sulfides formed under the effect of the various stresses encountered, especially mechanical and/or thermal stresses, it being possible for the above decomposition process to be accelerated in the presence of moisture. Moreover, the use of cobalt salts renders the rubber compositions more sensitive to oxidation and to ageing, and significantly increases the cost thereof, not to mention that it is desirable to eliminate, in the long run, the use of such cobalt salts in rubber compositions due to the recent change in European regulations relating to metal salts of this type.

For all the reasons set out above, manufacturers of metal/rubber composites, in particular motor vehicle tyre manufacturers, are seeking novel adhesive solutions in order to adhesively bond metal reinforcers to rubber compositions, while overcoming, at least in part, the abovementioned disadvantages.

Thus, the recently published applications WO 2014/063963, WO 2014/063968, WO 2014/173838, WO 2014/173839, filed by the applicant companies, have described novel polymers with urea, urethane or thiourea units, and also the initial monomers thereof, which meet the above objectives. Used in particular as adhesion primer on metal in metal/rubber composites, these polymers make it possible very advantageously to adhesively bond the metal to the rubber matrices by subsequently using simple textile adhesives, such as "RFL" (resorcinol/formaldehyde latex) adhesives or other equivalent adhesive compositions, or else directly (that is to say, without employing such adhesives) to these rubber matrices when the latter contain, for example, appropriate functionalized unsaturated elastomers, such as epoxidized elastomers. Thus, the cobalt salts (or other metal salts) can in particular be dispensed with in the rubber compositions intended to be connected to brass-coated metal reinforcers.

In continuing their research, the applicant companies have found a novel polymer, of thermosetting type, which at ambient temperature has the same adhesive performance, with respect to metal and rubber, as the aforementioned polymers but which has, once thermoset (crosslinked), further improved thermal and chemical stability. Moreover, its specific microstructure makes it possible very advantageously to adjust the flexibility of the molecule depending on the particular applications targeted.

3. BRIEF DESCRIPTION OF THE INVENTION

Thus, the present invention relates to a metal or metallized reinforcer, at least the surface of which is at least partially metallic, at least said metallic part being coated with a polybenzoxazine comprising at least repeat units comprising at least one unit corresponding to the formulae (I) or (II):

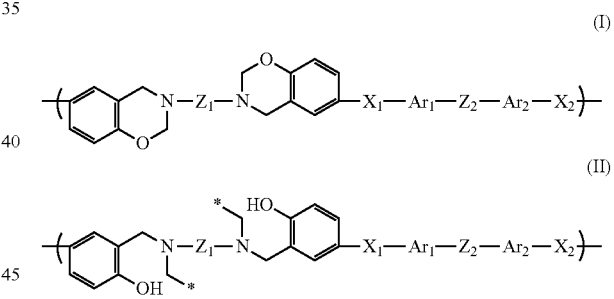

in which:
Z$_1$ represents an at least divalent, aliphatic, cycloaliphatic or aromatic bonding group comprising at least one carbon atom and optionally at least one heteroatom selected from O, S, N and P;
X$_1$ and X$_2$, which are identical or different, represent O or S;
Ar$_1$ and Ar$_2$, which are identical or different, represent a substituted or unsubstituted phenylene group;
Z$_2$ represents O or (S)$_n$, the symbol "n" representing an integer equal to 1 or greater than 1.

The invention relates in particular to such a reinforcer in the form of a wire, film, tape or cord, at least one part of the surface of which is made of steel, in particular of carbon steel, it being possible for said steel to be a bright steel, i.e. uncoated steel, or else to be coated with at least one second metal, referred to as surface metal, the latter being preferentially selected from the group consisting of aluminium, copper, zinc and alloys of at least one of these metals with at least one other metal.

Owing to the above polybenzoxazine, the reinforcer of the invention is capable of adhesively bonding matrices of ethylenically unsaturated polymers such as rubber, in particular without the use of cobalt salts in these polymer matrices being necessary.

The invention also relates to the use of such a reinforcer for the reinforcement of a rubber article, in particular a pneumatic or non-pneumatic motor vehicle tyre.

The invention also relates to any rubber article, in the uncured (non-crosslinked) state or cured (crosslinked) state, in particular any pneumatic or non-pneumatic motor vehicle tyre, which is reinforced by at least one such reinforcer.

BRIEF DESCRIPTION OF THE FIGURES

The invention and the advantages thereof will be easily understood in the light of the detailed description and exemplary embodiments which follow, and also of the figures relating to these examples, which represent or depict:

- the general principle for synthesis of a benzoxazine compound from three compounds, phenol, formaldehyde and amine (R=residue of the amine) (FIG. 1a);
- the (ring-opening) mechanism for opening, by heat input, the oxazine ring of such a benzoxazine compound (FIG. 1b);
- a general scheme for the synthesis, starting from a halogenated phenol (the symbol Hal representing a halogen), paraformaldehyde and a diamine, of a halogenated benzoxazine of formula (A) (Monomer denoted by M) that can be used for the synthesis of a polybenzoxazine suitable for the reinforcer of the invention (FIG. 2);
- a possible scheme for the synthesis, starting from a halogenated phenol, p-formaldehyde and a specific diamine, of aliphatic type, of a particular halogenated benzoxazine of formula (A-1) (Monomer denoted by M-1) that can be used for the synthesis of a polybenzoxazine suitable for the reinforcer of the invention (FIG. 3);
- another possible scheme for the synthesis, starting from a halogenated phenol, p-formaldehyde and another specific diamine, of aromatic type, of another example of a particular halogenated benzoxazine of formula (A-2) (Monomer denoted by M-2) that can be used for the synthesis of another polybenzoxazine suitable for the reinforcer of the invention (FIG. 4);
- three other possible schemes for the synthesis, starting from a halogenated phenol, p-formaldehyde and specific diamines that are all aliphatic, of other examples of particular halogenated benzoxazines of respective formulae (A-3), (A-4) and (A-5) (Monomers denoted by M-3, M-4 and M-5) that can be used for the synthesis of other polybenzoxazines suitable for the reinforcer of the invention (FIG. 5, FIG. 6 and FIG. 7);
- another possible scheme for the synthesis, starting from a halogenated phenol, p-formaldehyde and a specific aliphatic triamine, of another example of a particular halogenated benzoxazine of formula (A-6) (Monomer denoted by M-6) that can be used for the synthesis of another polybenzoxazine suitable for the reinforcer of the invention (FIG. 8);
- a general scheme for the synthesis of a polybenzoxazine polymer (Polymer denoted by P) suitable for the reinforcer of the invention, starting from the halogenated benzoxazine of formula (A) (Monomer M) from FIG. 2 and another monomer of generic formula (B) (Monomer denoted by N) of aromatic diol or thiol type (FIG. 9);
- a scheme for the synthesis of a particular polybenzoxazine polymer (Polymer denoted by P-1) suitable for the reinforcer of the invention, starting from a particular halogenated benzoxazine of formula (A-7) (Monomer M-7) and another particular monomer of formula (B-1) (Monomer N-1) of sulfur-containing aromatic diol type (bearing a thioether function) (FIG. 10);
- a scheme for the synthesis of another polybenzoxazine (Polymer denoted by P-2) suitable for the reinforcer of the invention, starting from the particular halogenated benzoxazine of formula (A-7) (Monomer M-7) from the preceding FIG. 10 and another particular monomer of formula (B-2) (Monomer N-2) of aromatic thiol type (bearing an ether function) (FIG. 11);
- a scheme for the synthesis of another polybenzoxazine (Polymer denoted by P-3) suitable for the reinforcer of the invention, starting from the halogenated benzoxazine of formula (A-7) (Monomer M-7) and another particular monomer of formula (B-3) (Monomer N-3) of aromatic thiol type (bearing a thioether function) (FIG. 12);
- the polybenzoxazine (Polymer denoted here by P') suitable for the reinforcer of the invention from FIG. 9 once the oxazine rings thereof have been opened after heat treatment of the Polymer P (FIG. 13);
- the particular polybenzoxazine (Polymer denoted by P-1') suitable for the reinforcer of the invention of FIG. 10, once the oxazine rings thereof have been opened after heat treatment of the Polymer P-1 (FIG. 14);
- the scheme for the synthesis, starting from brominated phenol (compound 1), p-formaldehyde (compound 3) and a specific aliphatic diamine (compound 2), of a particular brominated dibenzoxazine of formula (A-8) (Monomer denoted by M-8) that can be used for the synthesis of polybenzoxazines (Polymer P-4 and P-4' from FIG. 17) suitable for the reinforcer of the invention (FIG. 15);
- the $^1$H NMR spectrum (500 MHz) of Monomer M-8 dissolved in $CD_2Cl_2$ (FIG. 16);
- the scheme for the synthesis of a particular polybenzoxazine (Polymer denoted by P-4) suitable for the reinforcer of the invention, starting from the particular halogenated benzoxazine of formula (A-8) (Monomer M-8) from the preceding FIG. 15 and the particular monomer of formula (B-1) (Monomer N-1), and also the structure of this polymer once the oxazine rings thereof have been opened (Polymer denoted by P-4') (FIG. 17);
- in radial section, an example of a tyre according to the invention, incorporating a reinforcer in accordance with the invention (FIG. 18).

4. DETAILED DESCRIPTION OF THE INVENTION

It will firstly be recalled that benzoxazines are compounds of general formula:

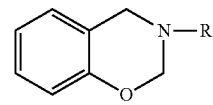

Figure 1A:
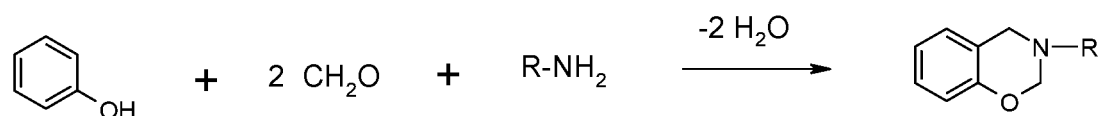

The appended FIG. 1a recalls the general principle for the synthesis of a benzoxazine, here starting from (condensation reaction) one molecule of phenol, two molecules of formaldehyde and an amine (R denoting the residue of the amine), with elimination of two molecules of water.

Figure 1B:
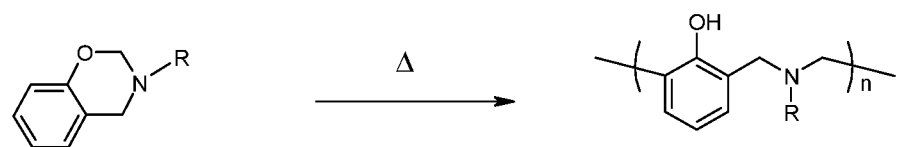

FIG. 1b itself recalls the (ring-opening) mechanism for opening the oxazine ring of such a compound during a heat input (represented by the symbol Δ).

Numerous benzoxazine compounds or monomers can thus be synthesized using various phenols and amines depending on their types of substituents. These groups of substituents may then provide polymerizable sites and enable the synthesis of various benzoxazine polymers (or polybenzoxazines).

Benzoxazines and polybenzoxazines which are derived therefrom are products that are nowadays well known to a person skilled in the art; to cite but a few publication examples, mention may be made of the articles "*Polybenzoxazines—New high performance thermosetting resins: synthesis and properties*"; N. N. Ghosh et al., Prog. Polym. Sci. 32 (2007), 1344-1391, or "*Recent Advancement on Polybenzoxazine—A newly Developed High Performance Thermoset*", Y. Yaggi et al., J. Polym. Sci. Part A: Polym. Chem., Vol. 47 (2009), 5565-5576, and also for example the patents or patent applications U.S. Pat. No. 5,543,516, WO 2013/148408.

As explained in detail in the above documents, polybenzoxazines have the remarkable ability, at high temperature (for example typically above 150° C. or even above 200° C. depending on their particular microstructure) to open their oxazine rings and to thus result in thermosetting polyphenolic resin structures.

The specific polybenzoxazine suitable for the reinforcer of the invention derives from a benzoxazine (referred to as Monomer M in the present application) of halogenated type that corresponds to the following generic formula (A), Hal representing a (at least one, i.e. one or more) halogen:

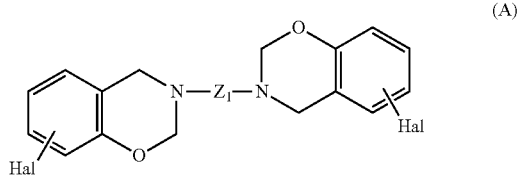

(A)

Figure 2:
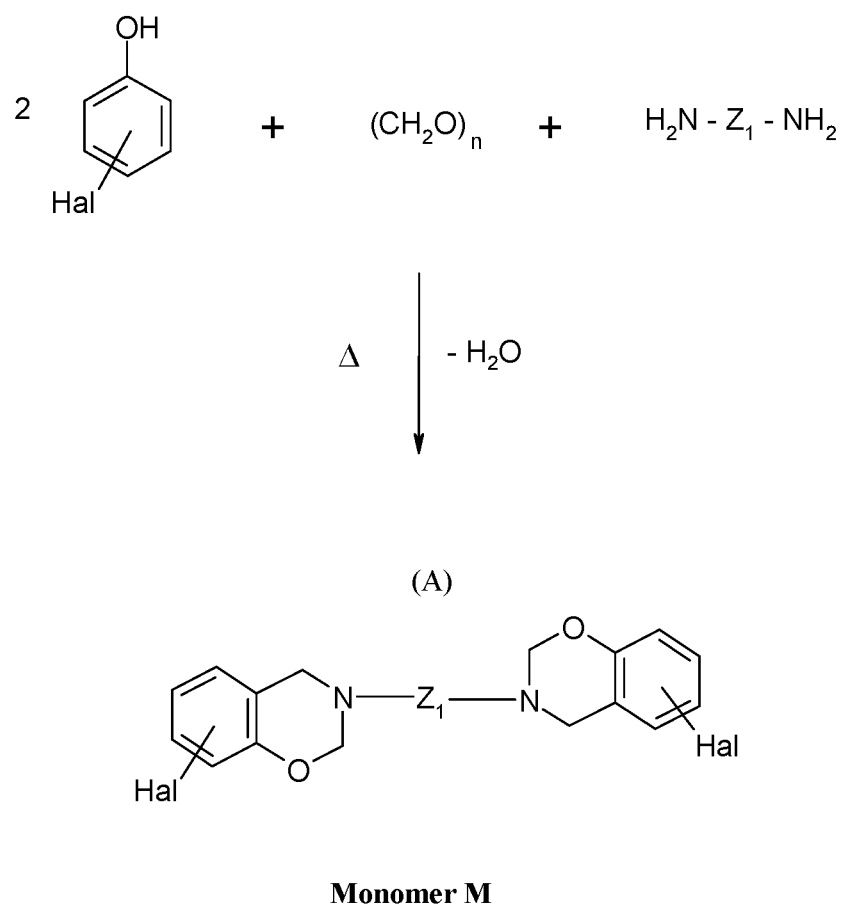

The appended FIG. 2 gives the general scheme for the synthesis thereof, under heat input and with elimination of water, starting from a halogenated phenol, p-formaldehyde and a diamine.

In the formula (A) above, $Z_1$ represents a bonding group (spacer) that is at least divalent, that is to say that it could comprise more than two covalent bonds, for example three or four covalent bonds. Preferably, $Z_1$ is divalent, that is to say comprises only two covalent bonds.

$Z_1$ may be aliphatic, cycloaliphatic or aromatic. This group, which may be ethylenically saturated or unsaturated, by definition comprises at least one (i.e. one or more) carbon atom, and optionally at least one (i.e. one or more) heteroatom chosen from O (oxygen), S (sulfur), N (nitrogen) and P (phosphorus).

According to one particular embodiment of the invention, $Z_1$ represents an aliphatic group comprising from 1 to 20, more preferentially from 1 to 16, in particular from 1 to 12 carbon atoms, or else a cycloaliphatic group comprising from 3 to 20, more preferentially from 3 to 16, in particular from 3 to 12 carbon atoms. More preferentially still, Z1 represents a $C_1$-$C_{20}$, preferably $C_1$-$C_{16}$, in particular $C_1$-$C_{12}$ alkylene group.

Each benzene ring of the Monomer M bears at least one (i.e. one or more) halogen. Moreover, in this monomer of formula (A), one or more hydrogen atoms of at least one or each benzene ring may (optionally) be substituted by various substituents, for example by functional groups capable of promoting the adhesion of the polymer to the metal and/or to the rubber.

Preferably, each benzene ring of the monomer M bears a single halogen (Hal) or at most two, more preferentially one and only one halogen, the latter being more preferentially located in the para position to the oxygen of the oxazine ring.

According to one particularly preferential embodiment, Hal represents bromine.

Figure 3:
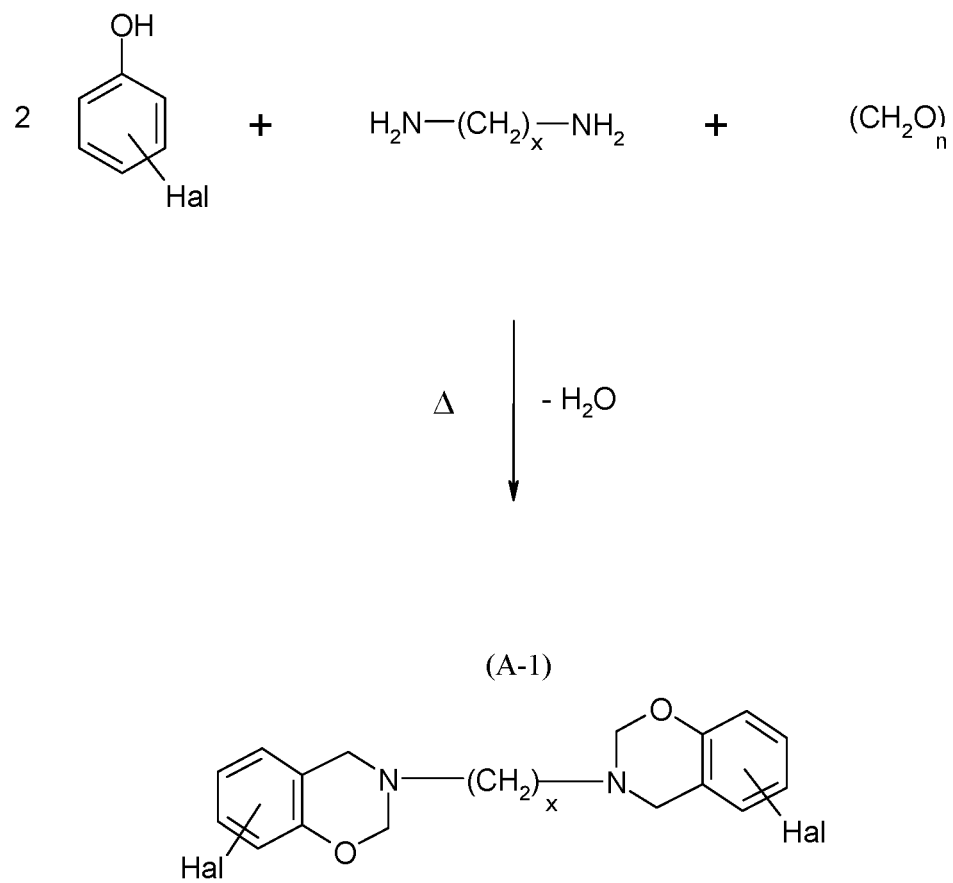
Figure 15:
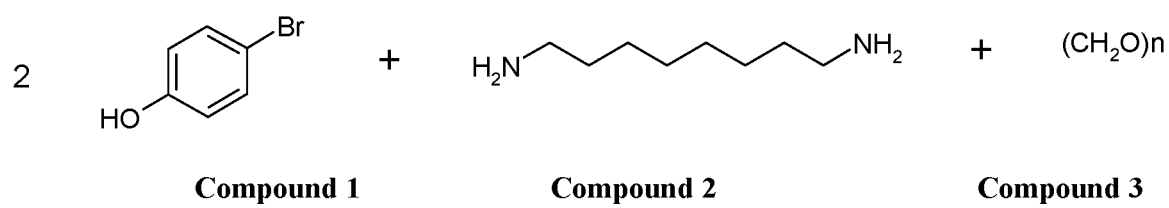
Figure 15:
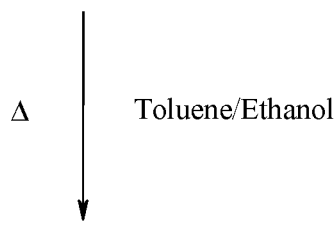
Figure 15:
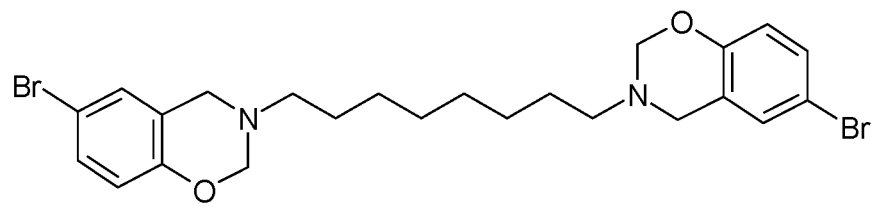

FIG. 3 illustrates a possible scheme for the synthesis, starting from a specific diamine of aliphatic type (polyethylene diamine), of a particular halogenated benzoxazine of formula (A-1), this benzoxazine being able to be used as monomer (Monomer denoted by M-1) for the subsequent synthesis of a polybenzoxazine suitable for the reinforcer in accordance with the invention. It is noted that $Z_1$ represents here a —$(CH_2)_x$— methylene group in which the symbol "x" represents an integer that preferably varies from 1 to 20, more preferentially from 1 to 16, in particular from 1 to 12. Such a synthesis will be described in more detail in the exemplary embodiments which follow (FIG. 15).

Figure 4:
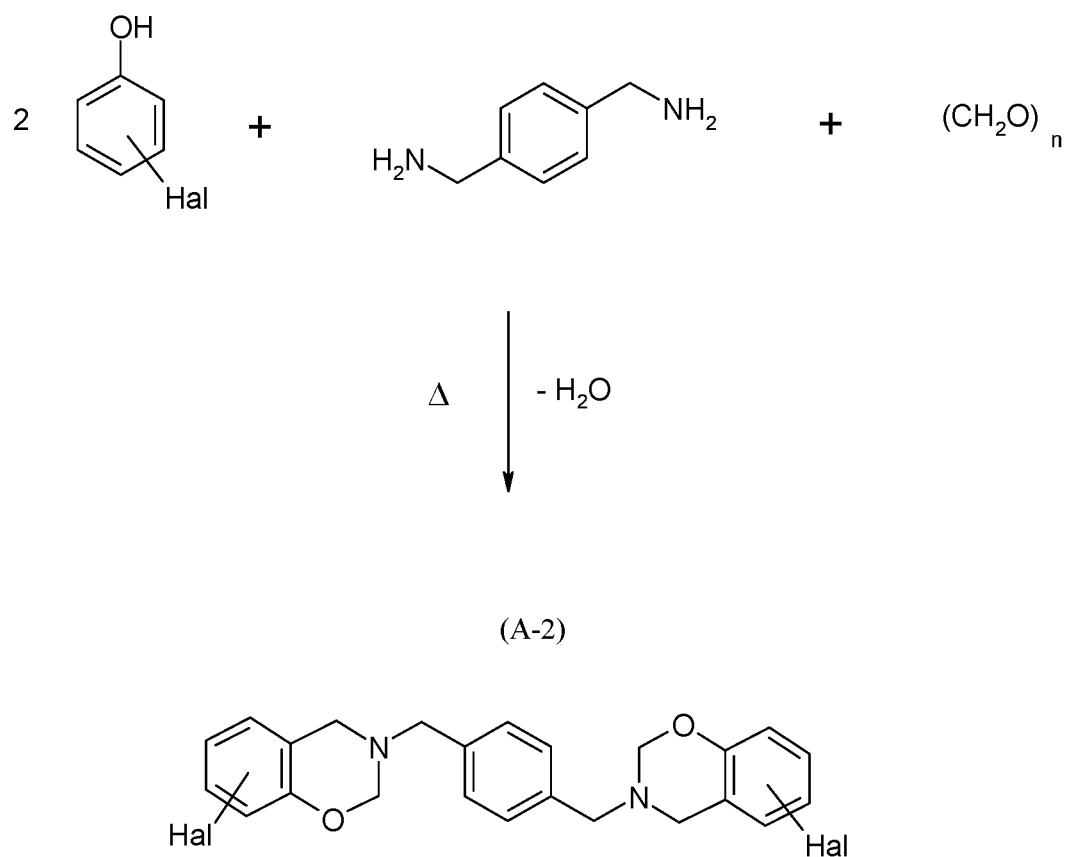

According to another preferred embodiment, $Z_1$ represents an aromatic group comprising from 6 to 30, more preferably from 6 to 20, carbon atoms. Thus, FIG. 4 illustrates another possible scheme for the synthesis, this time starting from a specific diamine of aromatic type (p-xylylene diamine), of another example of a particular halogenated benzoxazine of formula (A-2), that can be used as monomer (Monomer denoted by M-2) for the subsequent synthesis of another polybenzoxazine suitable for the reinforcer of the invention.

Figure 5:
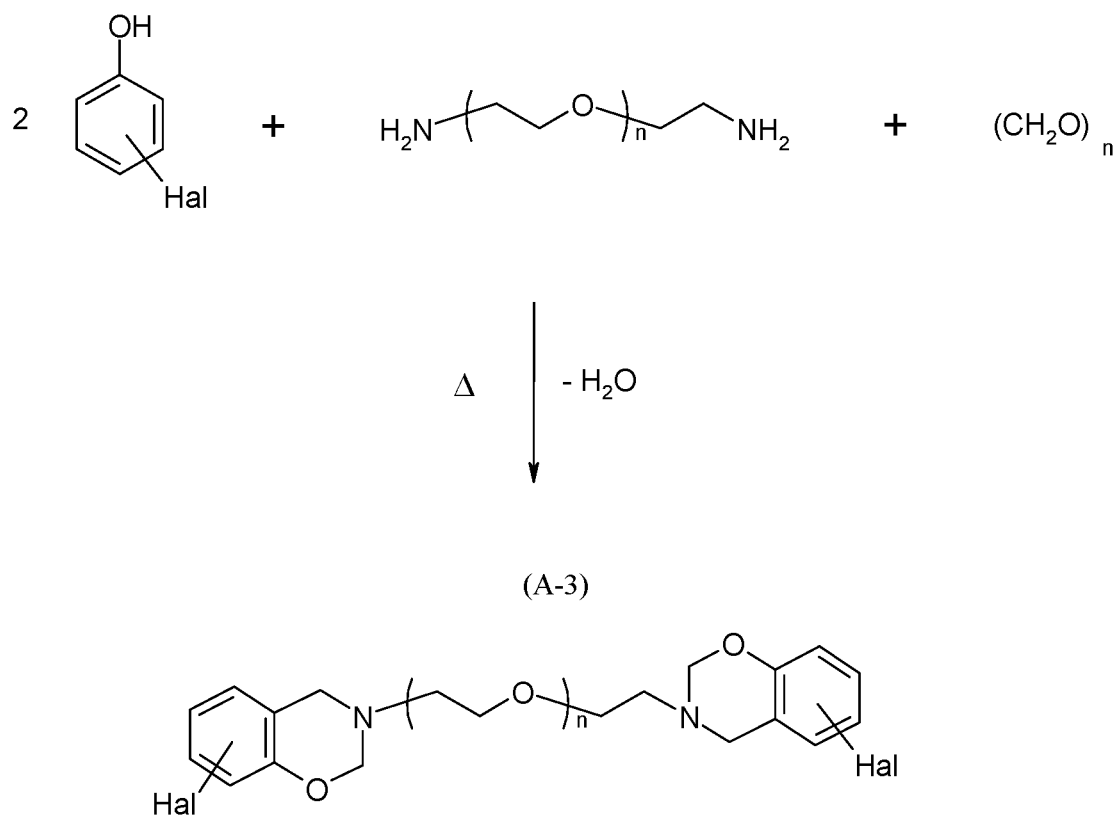
Figure 6:
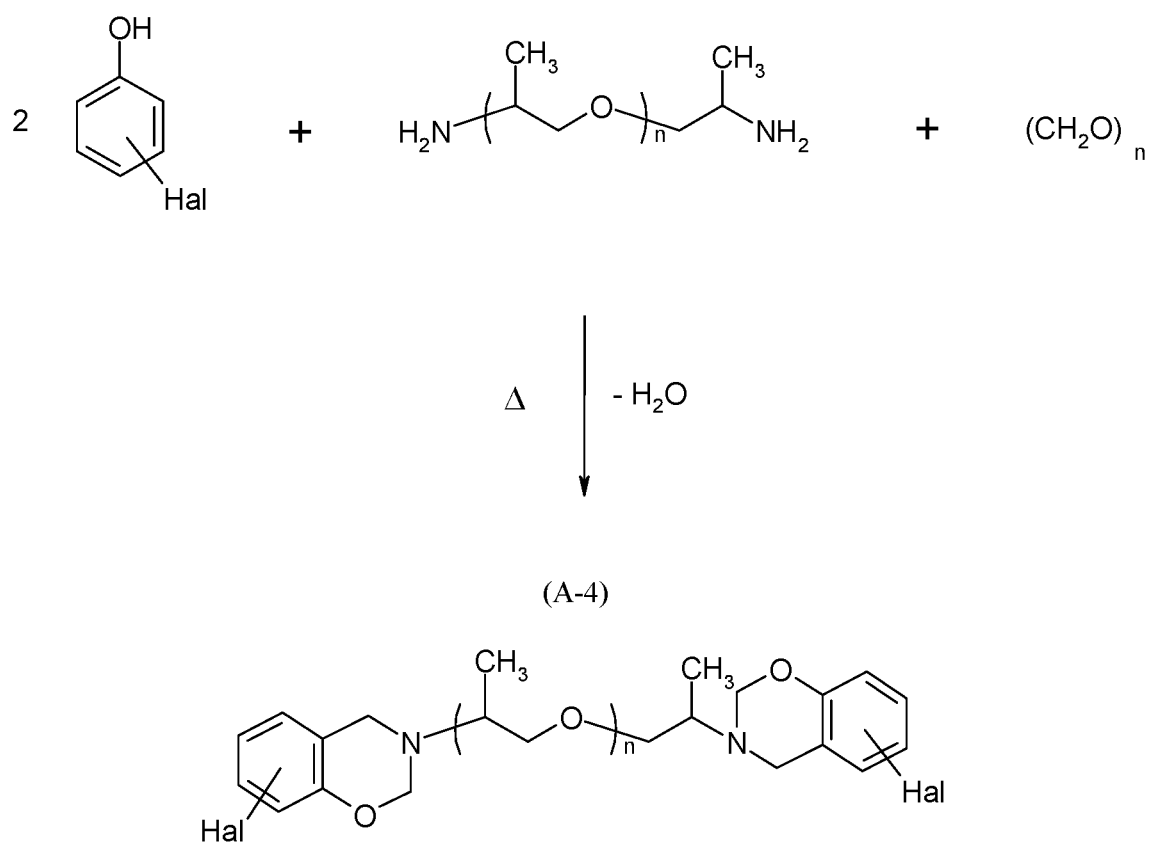
Figure 7:
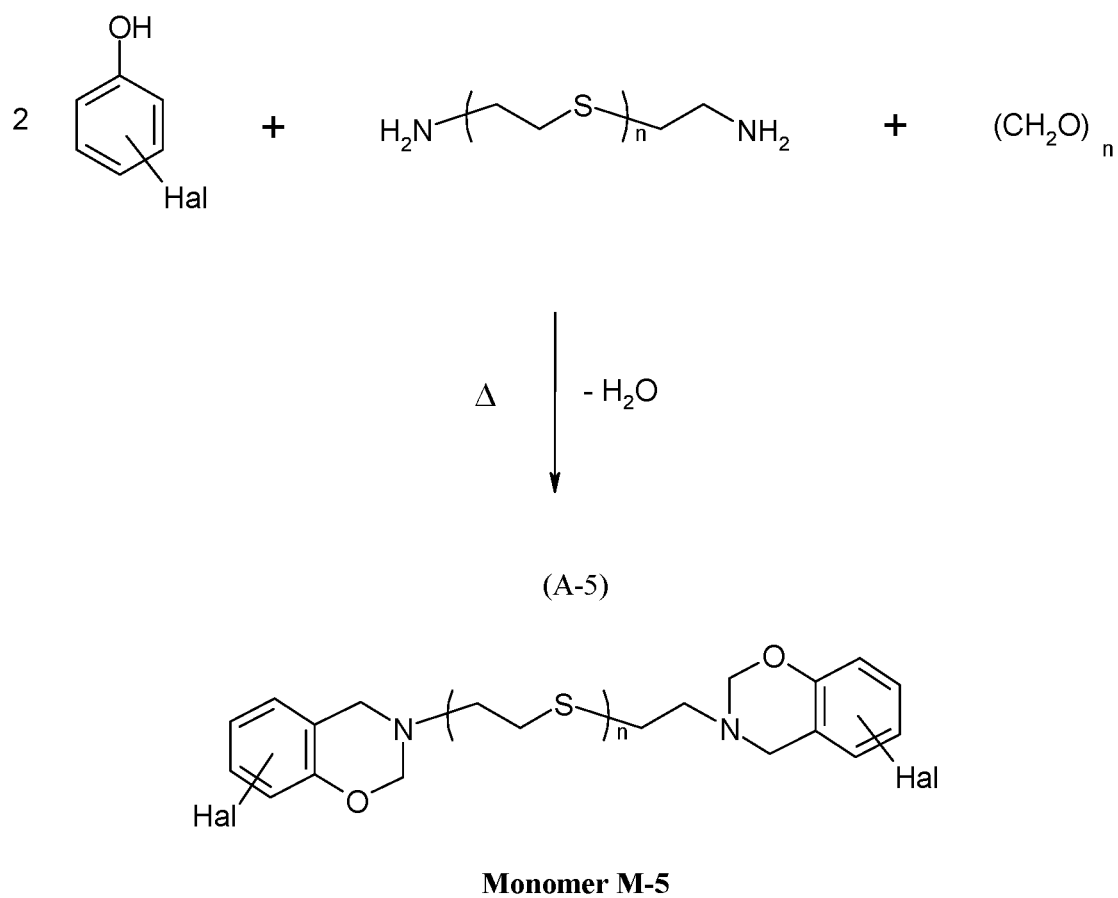

FIGS. 5, 6 and 7 illustrate three other possible schemes for the synthesis, always starting from a halogenated phenol and paraformaldehyde on the one hand and, on the other hand, from various specific diamines, all of aliphatic type, of other examples of particular benzoxazines of respective formulae (A-3), (A-4) and (A-5) that can be used as monomers (Monomers respectively denoted by M-3, M-4 and M-5) for the synthesis of polybenzoxazines suitable for the reinforcer of the invention.

In FIG. 5, the repetition of the (polyethylene oxide) [—$CH_2$—$CH_2$—O—] units on the bonding group $Z_1$ is capable of resulting in polybenzoxazines of high crystallinity, whilst in FIG. 6, the presence of the (polypropylene oxide) methyl groups on $Z_1$ makes it possible to reduce the reactivity of the two amine end groups and to result in polybenzoxazines of lower crystallinity. In FIG. 7, the presence on the spacer $Z_1$ of the sulfur atom (heteroatom) in the (polyethylene thioether) [—$CH_2$—$CH_2$—S—] repeat units, is capable of further improving the adhesion of the polybenzoxazine to metal. Thus, it can be seen that the structure of the $Z_1$ group of the benzoxazine monomer may be modified considerably with the aim of adjusting the properties of the final polymer. This constitutes a major advantage of the present invention.

Figure 8:
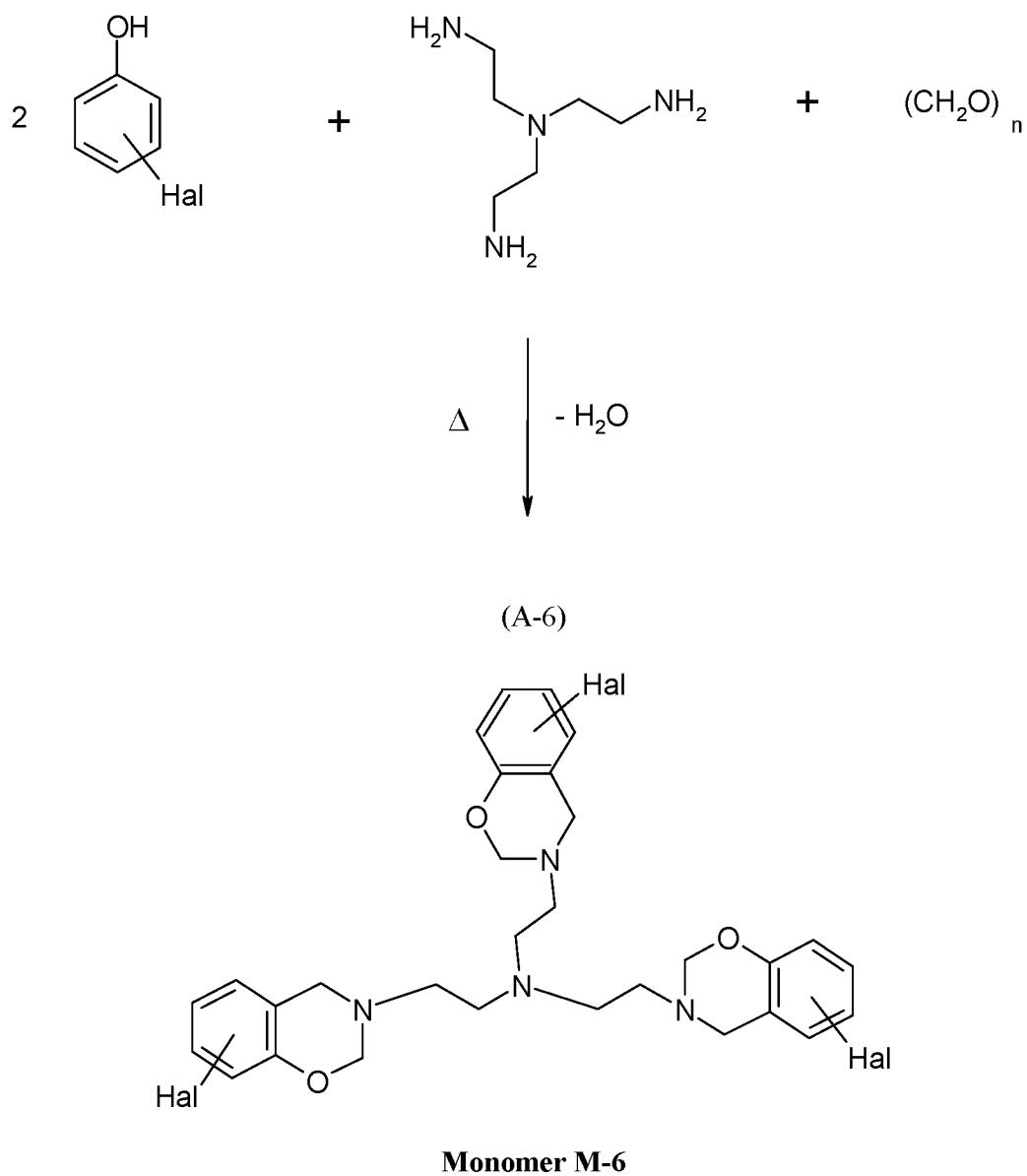

FIG. 8 illustrates another possible scheme for the synthesis, starting from a halogenated phenol, paraformaldehyde and a specific aliphatic polyamine consisting this time of a triamine, tris(3-aminopropyl)amine, of another example of a particular halogenated (tri)benzoxazine compound of formula (A-6) that can be used as a monomer (Monomer denoted by M-6) for the synthesis of another polybenzoxazine suitable for the reinforcer of the invention.

The polybenzoxazine (Polymer P) suitable for the reinforcement of the invention therefore has the essential feature of comprising structural repeating units comprising at least one unit corresponding to the formula (I) (before opening of the oxazine rings) or formula (II) (after ring opening) below:

$Z_2$ represents O or S (i.e. "n" equal to 1), more preferentially S;
$Z_1$ represents $(CH_2)_x$ in which "x" preferably varies from 1 to 20, more preferentially from 1 to 16, in particular from 1 to 12.

More preferentially, all of the preferential features above are satisfied simultaneously.

Moreover, in the formulae (I) and (II) above, one or more hydrogen atoms of at least one or each benzene ring $Ar_1$ and

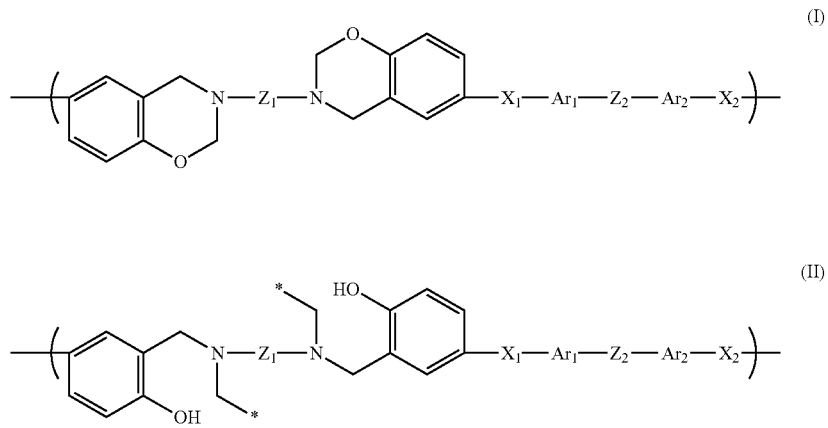

in which:
    $Z_1$ has the main definition and preferential definitions already given above for the benzoxazine (monomer) compound;
    $X_1$ and $X_2$, which are identical or different, represent O (oxygen) or S (sulfur);
    $Ar_1$ and $Ar_2$, which are identical or different, represent an aromatic ring;
    $Z_2$ represents O or $(S)_n$, the symbol "n" representing an integer equal to 1 (case of a single sulfur atom) or greater than 1 (case of several sulfur atoms).

A polymer should be understood here as any homopolymer or copolymer, in particular block copolymer, with repeating structural units comprising at least one unit of formula (I) or (II) above; the polymer of the invention may of course comprise both units of formula (I) and units of formula (II).

In formula (II) above, a person skilled in the art will immediately understand that the two symbols "*" (which are identical or different) represent any attachment of the unit to a carbon atom or to a heteroatom (preferably chosen from O, S, N and P), which attachment or bond results from the opening of the oxazine rings.

Figure 9:
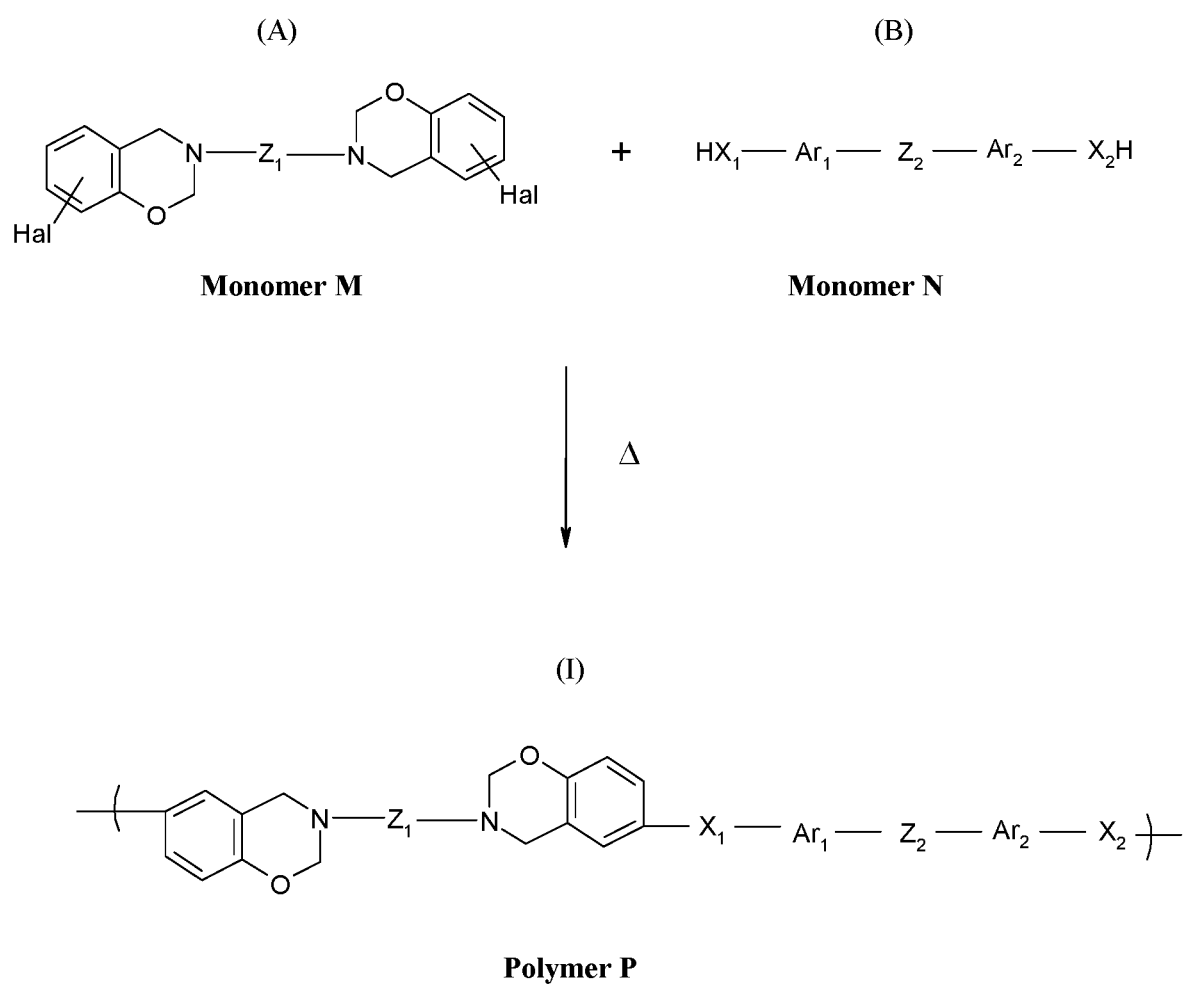

FIG. 9 represents a general scheme for the synthesis, by polycondensation, of such a polybenzoxazine (Polymer P) suitable for the invention, starting from the halogenated benzoxazine of formula (A) from FIG. 2 (Monomer M) and from another monomer, of generic formula denoted by (B), which has the feature of being of aromatic diol or thiol type (generic Monomer denoted by N).

In the general formulae (I) and (II) above, preferentially at least one of the following features is satisfied:
    $Ar_1$ and $Ar_2$ each represent an unsubstituted benzene ring;
    $X_1$ and $X_2$ each represent either a sulfur atom, or an oxygen atom;

$Ar_2$ could (optionally) be substituted by one or more substituents, which are identical or different, for example by functional groups capable of promoting the adhesion of the polymer to the metal and/or to the rubber.

Figure 13:
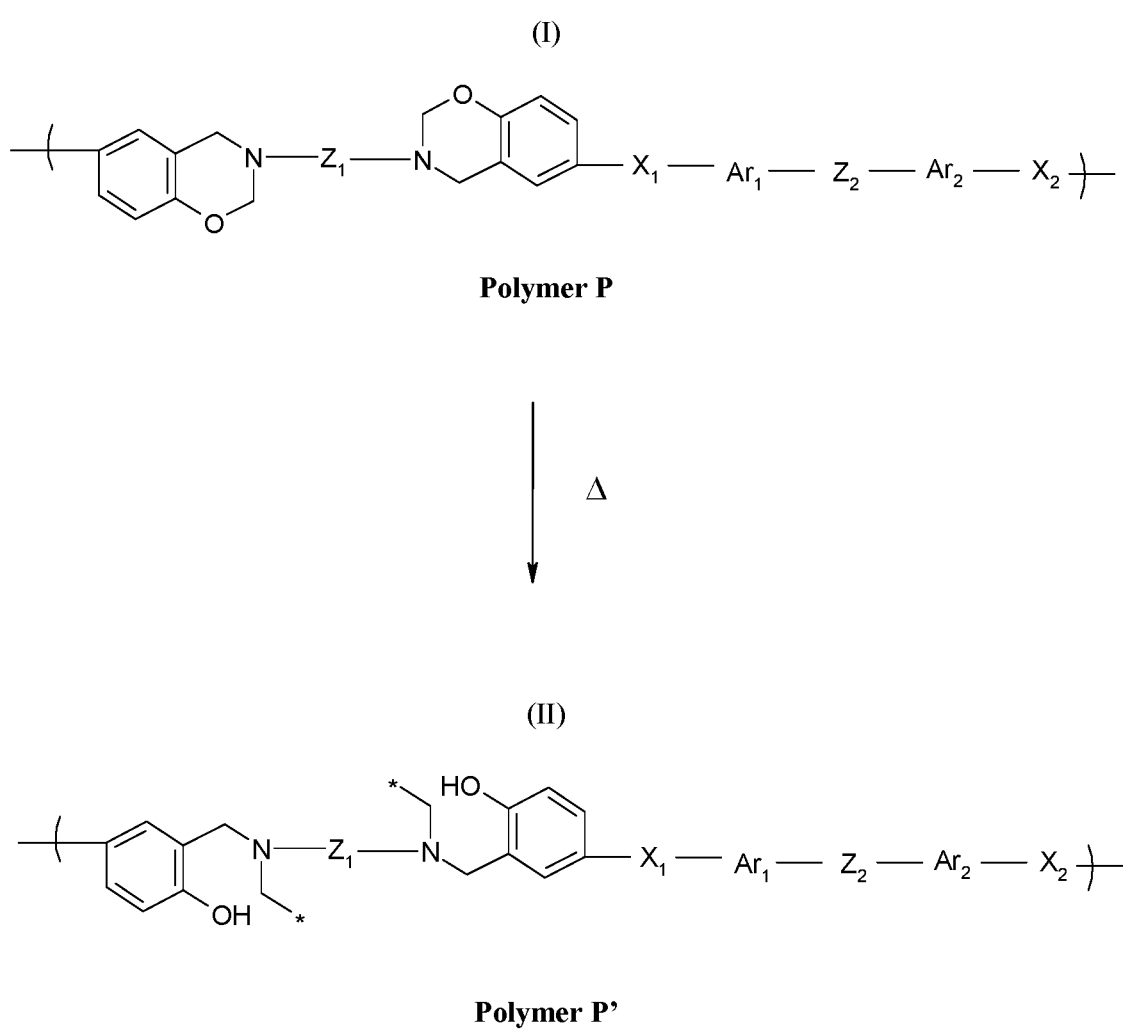

The polybenzoxazine "P" from FIG. 9, more precisely at least some of its repeat units, has also been represented in FIG. 13, before (FIG. 13a, Polymer P) and after (FIG. 13b, Polymer P') the opening of its oxazine rings.

Figure 10:
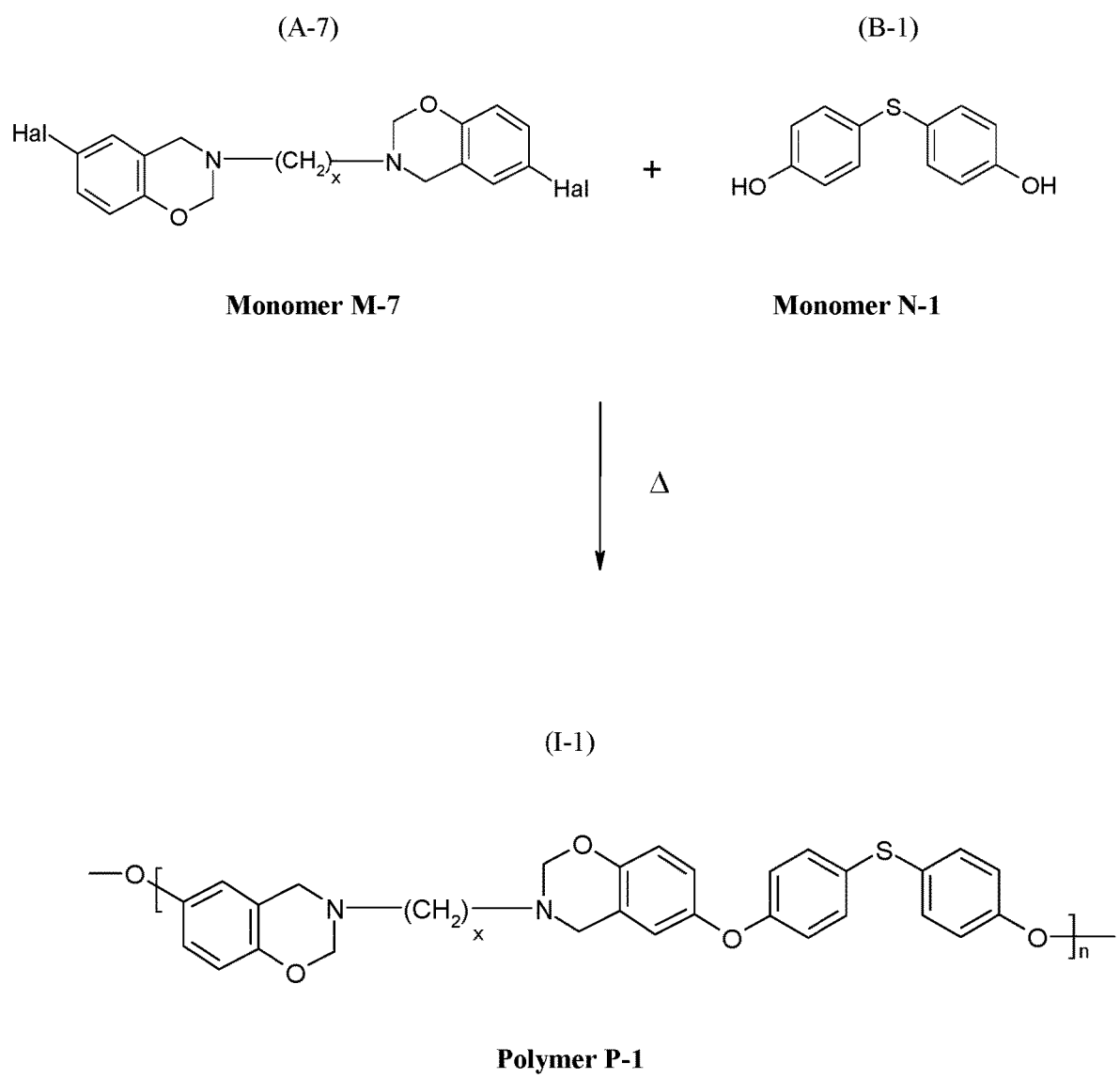

FIG. 10 represents a particular scheme for the synthesis of a specific polybenzoxazine (Polymer denoted by P-1) of formula (I-1) suitable for the reinforcer according to the invention, starting from a particular halogenated benzoxazine (Monomer M-7) of formula (A-7) and from another specific monomer (Monomer N-1) of formula (B-1) of sulfur-containing aromatic diol type (4,4'-thiodiphenol).

In this example, it is noted in particular, according to one preferred embodiment of the invention already described, that each benzene ring of the monomer M-7 bears one and only one halogen (Hal), more preferentially bromine, this halogen being more particularly located in the para position to the oxygen of the oxazine ring.

Figure 14:
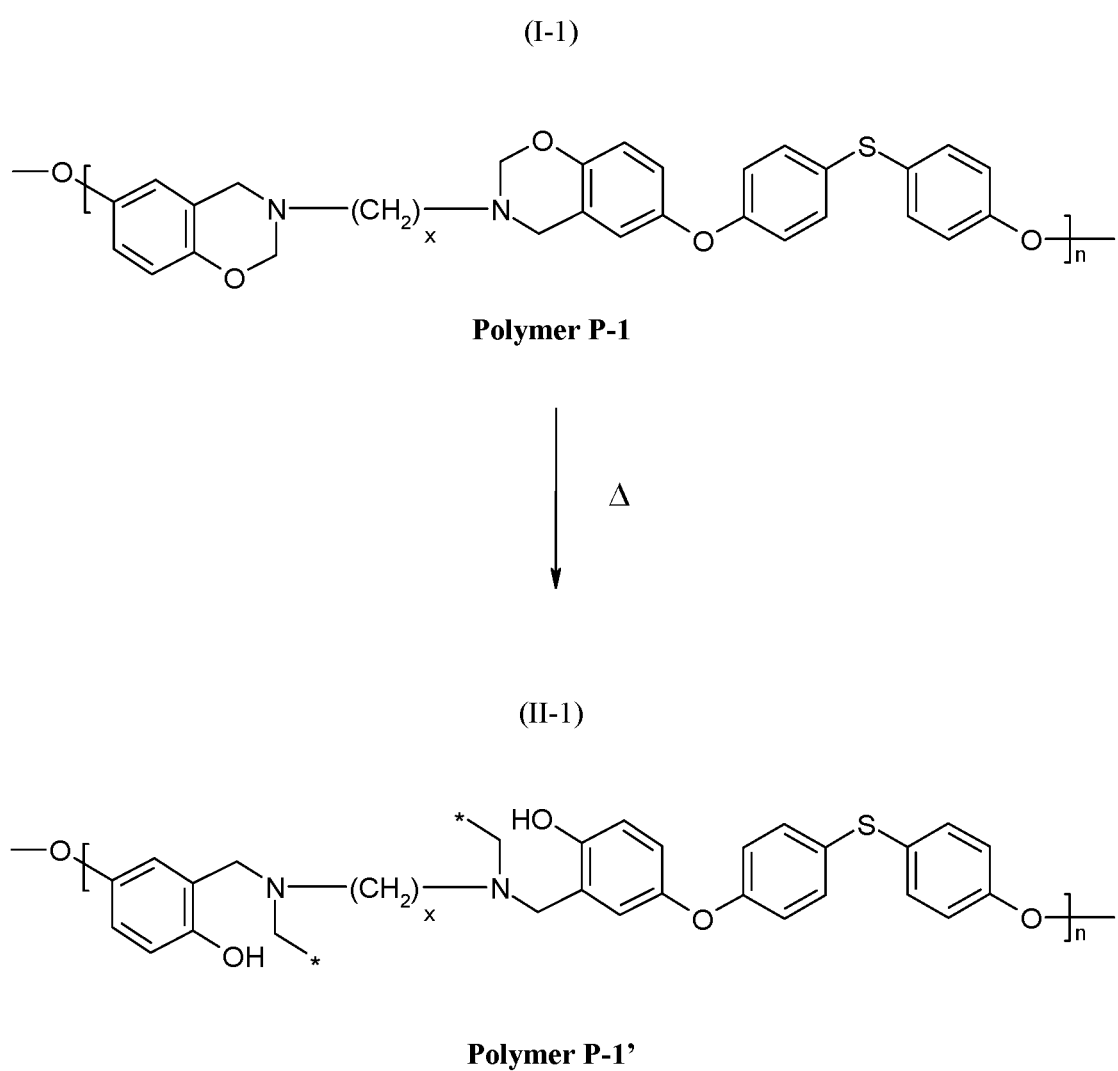

This polybenzoxazine from FIG. 10, or more precisely at least some of its repeat units, has also been represented in FIG. 14, before (FIG. 14a, Polymer P-1) and after (FIG. 14b, Polymer P-1') the opening of its oxazine rings following a sufficient heat input.

Thus, according to one particularly preferred embodiment, the polybenzoxazine of the reinforcement of the invention is characterized by repeat units comprising at least one unit corresponding to the particular formulae (I-1) (before opening of the benzoxazine rings) or (II-1) (after ring opening):

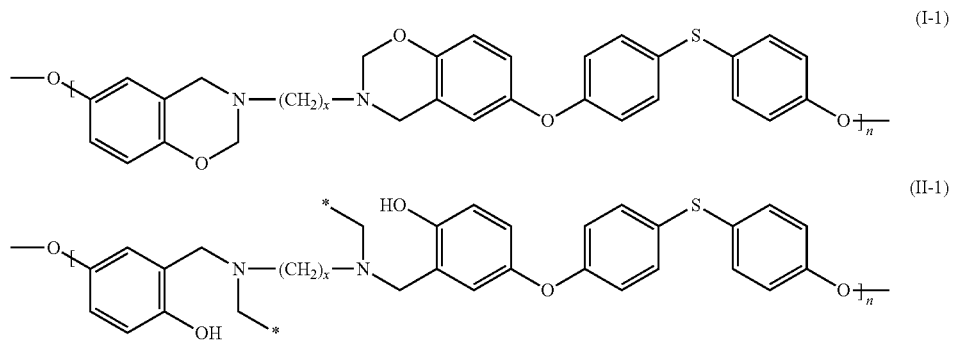

Figure 11:
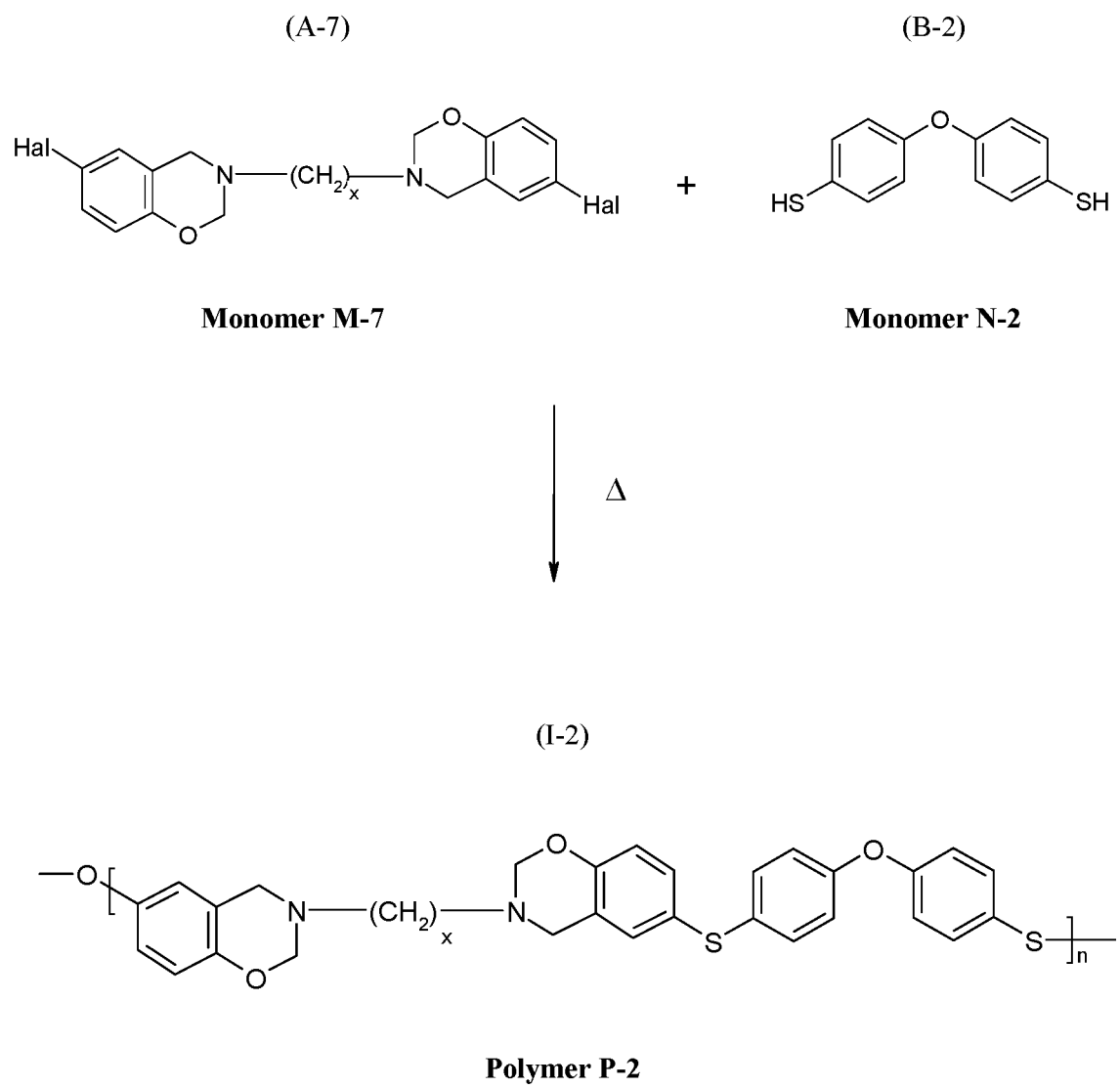

FIG. 11 represents another particular scheme for the synthesis of another specific polybenzoxazine (Polymer denoted by P-2) suitable for the invention, of formula (I-2), starting from the preceding specific halogenated benzoxazine (Monomer M-7) and from another specific monomer (Monomer N-2) of formula (B-2), of aromatic thiol type (further bearing an ether function).

Figure 12:
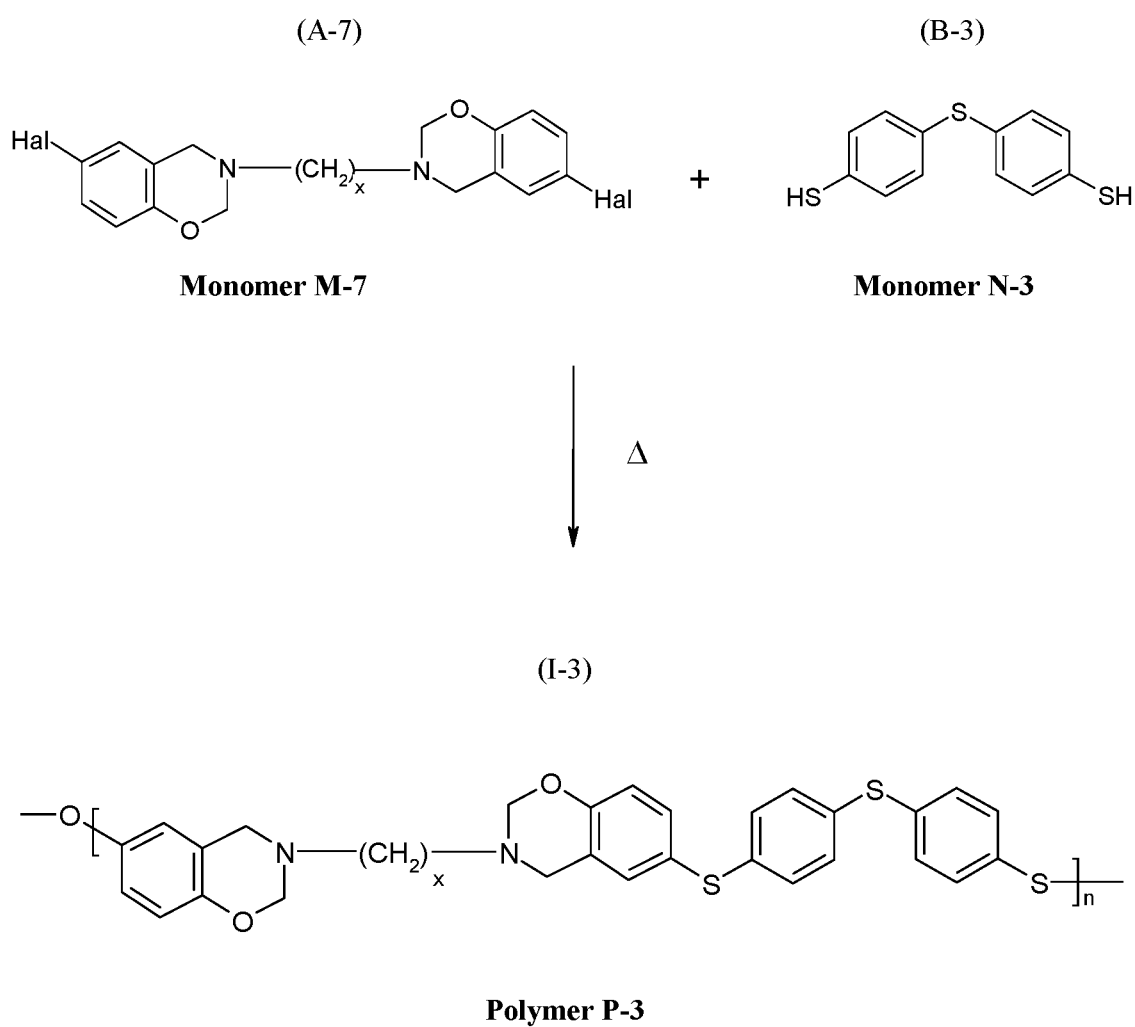

FIG. 12 represents another particular scheme for the synthesis of another specific polybenzoxazine (Polymer denoted by P-3) suitable for the reinforcer according to invention, of formula (I-3), starting from the preceding specific halogenated benzoxazine (Monomer M-7) and from another specific monomer (Monomer B2) of aromatic thiol type (further bearing a thioether function).

In these examples from FIGS. 11 and 12, as for the preceding FIG. 10, it is noted in particular, according to one preferred embodiment of the invention already indicated, that each benzene ring of the monomer M-7 bears one and only one halogen (Hal), more preferentially bromine, located more particularly in the para position to the oxygen of the oxazine ring.

As already indicated, FIGS. 13 and 14 also represent polybenzoxazines suitable for the reinforcer according to the invention (here respectively denoted by P' and P-1') from FIG. 9 and FIG. 10, once their oxazine rings are open.

Typically, the polybenzoxazine of the reinforcer of the invention may comprise from ten to several hundred, preferably from 50 to 300 structural units having units of formula (I) and/or (II), in particular structural units as represented as examples in FIGS. 10 to 14 and 17.

The polybenzoxazine of the invention can advantageously be used, as adhesion primer or as sole adhesive layer, for coating the reinforcer of the invention and adhering the latter to rubber.

In order to adhere the rubber to the polybenzoxazine layer, use could be made of any known adhesive system, for example a conventional textile adhesive of "RFL" type comprising at least one diene elastomer such as natural rubber, or any equivalent adhesive known for imparting satisfactory adhesion between rubber and conventional polymers such as polyester or polyamide, such as for example the adhesive compositions described in the patent applications WO 2013/017421, WO 2013/017422, WO 2013/017423, WO 2015/007641, WO 2015/007642.

Before the above adhesive coating process, it might be advantageous to activate the surface of the polybenzoxazine layer, for example physically and/or chemically, to improve the adhesive uptake thereof and/or the final adhesion thereof to the rubber. A physical treatment could consist, for example, of a treatment by radiation such as an electron beam, or by plasma; a chemical treatment could consist, for example, of prior passage through a bath of epoxy resin and/or isocyanate compound.

A person skilled in the art will readily understand that the connection between the metal reinforcer provided with its polybenzoxazine layer and the rubber layer with which it is in contact will be definitively provided during the final curing (crosslinking) of the rubber article in question.

The polybenzoxazine described above can be used very particularly on any type of metal reinforcer, typically of filiform type such as for example a wire, a film (by convention, having a width of greater than 5 cm), a tape (by convention a narrower film having a width at most equal to 5 cm) or a cord made of steel, in particular of carbon steel, intended in particular for reinforcing a matrix of unsaturated rubber such as natural rubber.

The steel, in particular carbon steel, may be a bright steel, i.e. uncoated steel, or else may be coated at least partially with at least one layer (therefore intermediate layer, positioned between steel and polybenzoxazine layer) of a second metal, referred to as surface metal, this surface metal being preferentially selected from the group consisting of aluminium, copper, zinc and alloys of at least one of these metals with at least one other metal (which may or may not belong to this group). By way of more preferred example, the surface metal is brass.

The carbon steel is preferentially such as normally used in cords of "steel cord" type for motor vehicle tyres; however, it is, of course, possible to use other steels, for example stainless steels. When a carbon steel is used, its carbon content is preferably between 0.4% and 1.2%, in particular between 0.5% and 1.1%. The invention applies in particular to any steel of the normal tensile ("NT"), high tensile ("HT"), super high tensile ("SHT") or ultra high tensile ("UHT") steel cord type.

The invention also relates to any rubber article, in the uncured (i.e. non-crosslinked) state or cured (crosslinked) state, in particular any pneumatic or non-pneumatic motor vehicle tyre, comprising a reinforcer according to the invention. This tyre of the invention may be intended for all types of motor vehicles, in particular passenger vehicles or industrial vehicles such as heavy duty vehicles, civil engineering vehicles, and other transport or handling utility vehicles.

Figure 18:
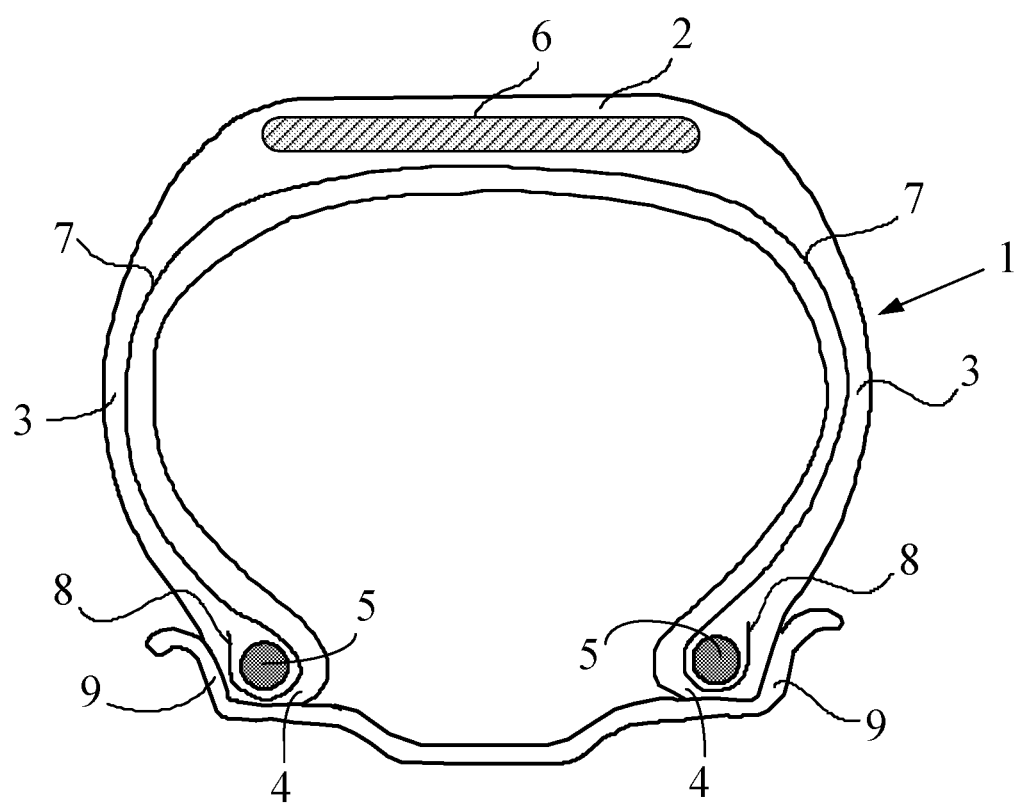

By way of example, FIG. 18 represents highly schematically (without being true to a specific scale) a radial section of a tyre in accordance with the invention, for example for a motor vehicle of the passenger vehicle type or for a heavy duty vehicle.

This tyre 1 comprises a crown 2 reinforced by a crown reinforcement or belt 6, two sidewalls 3 and two beads 4, each of these beads 4 being reinforced with a bead wire 5. The crown 2 is surmounted by a tread, not represented in this diagrammatic figure. A carcass reinforcement 7 is wound around the two bead wires 5 in each bead 4, the turn-up 8 of this reinforcement 7 being, for example, positioned towards the outside of the tyre 1, which is here represented fitted onto its wheel rim 9.

The carcass reinforcement 7 is, in a way known per se, formed, for example, from at least one rubber ply reinforced by reinforcers referred to as "radial" reinforcers, that is to say that these reinforcers are positioned virtually parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 6).

The belt 6 is, for example, composed, also in a way known per se, of at least two superimposed and crossed rubber plies, known as "working plies" or "triangulation plies", reinforced with metal reinforcers positioned substantially parallel to one another and inclined with respect to the median circumferential plane, it being possible for these working plies to optionally be combined with other rubber plies and/or fabrics. The primary role of these working plies is to give the pneumatic tyre a high cornering stiffness. The belt 6 can comprise, for example, a rubber ply, referred to as a "hooping ply", reinforced by reinforcing threads referred to as "circumferential" reinforcing threads, that is to say that these reinforcing threads are positioned virtually parallel to one another and extend substantially circumferentially around the pneumatic tyre so as to form an angle preferably within a range from 0° to 10° with the median circumferential plane. The primary role of these circumferential reinforcing threads is, it should be remembered, to withstand the centrifuging of the crown at high speed.

The tyre 1 of the invention has, for example, the essential feature that at least its belt (6) and/or its carcass reinforcement (7) comprises a reinforcer in accordance with the invention. According to another possible exemplary embodiment of the invention, it is the bead zone that may be reinforced with such a reinforcer; it is for example the bead wires (5) that could be formed, in whole or in part, of a such a reinforcer according to the invention.

5. EXEMPLARY EMBODIMENTS OF THE INVENTION

In the present application, unless expressly indicated otherwise, all the percentages (%) shown are % by weight.

The following tests firstly describe the synthesis of a benzoxazine compound (Monomer M-8), then that of a preferential polybenzoxazine (Polymer P-4) suitable for the reinforcers according to the invention. Lastly, adhesion tests are carried out in order to illustrate the excellent adhesive performance of the reinforcers of the invention coated with the polybenzoxazines which have been described above.

5.1. Synthesis of a Halogenated Benzoxazine Compound (Monomer M-8)

For this synthesis, a 250-ml three-neck round-bottomed flask, equipped with a thermometer, a nitrogen inlet, a magnetic stirrer halogenated benzoxazine compound and a condenser is provided.

The synthesis is carried out according to the procedure depicted in FIG. 15, as explained in detail below, starting from three compounds: a halogenated phenol (compound 1; 4-bromophenol; Aldrich product B75808), an aliphatic diamine (compound 2; 1,8-diaminooctane; Aldrich product D22401) and a p-formaldehyde (compound 3; Aldrich 158127 product), in the presence of two solvents (anhydrous toluene and anhydrous ethanol).

Compound 1 (2 eq, 10.38 g, i.e. 60 mmol) then ethanol (51 ml) are poured into the round-bottomed flask. The presence of ethanol is important here, preventing the formation of an unstable triazine-type intermediate product. While stirring, compound 2 (1 eq, 4.32 g, i.e. 30 mmol), compound 3 (4 eq, 3.60 g, i.e. 120 mmol) and finally the toluene (102 ml) are then introduced. The reaction medium is heated (around 75° C.) at reflux for 72 h, then placed on a rotary evaporator, at 50° C. under 50 mbar, to evaporate the solvents. A lemon-yellow-coloured oil is thus obtained.

This oil then undergoes a first purification on an $SiO_2$ column, with the aid of a diethyl ether/cyclohexane eluent, in a volume ratio of the two solvents that varies from 10:35 (initial) to 10:20 (final). The purified fractions containing the monomer (M-8) are recombined and the solvents are evaporated. A light yellow solid is thus obtained. The latter is placed in methanol (1 g per 80 ml) and heated at reflux (65° C.) for 30 min. The solution is then left to cool to ambient temperature (around 20° C.) for crystallization of the monomer. The solid product obtained is isolated by filtration (Büchner filter). White-coloured crystals are thus obtained, which are dried in a vacuum oven at 50° C., overnight, to eliminate any trace of solvent (reaction yield of around 60%).

Figure 16:
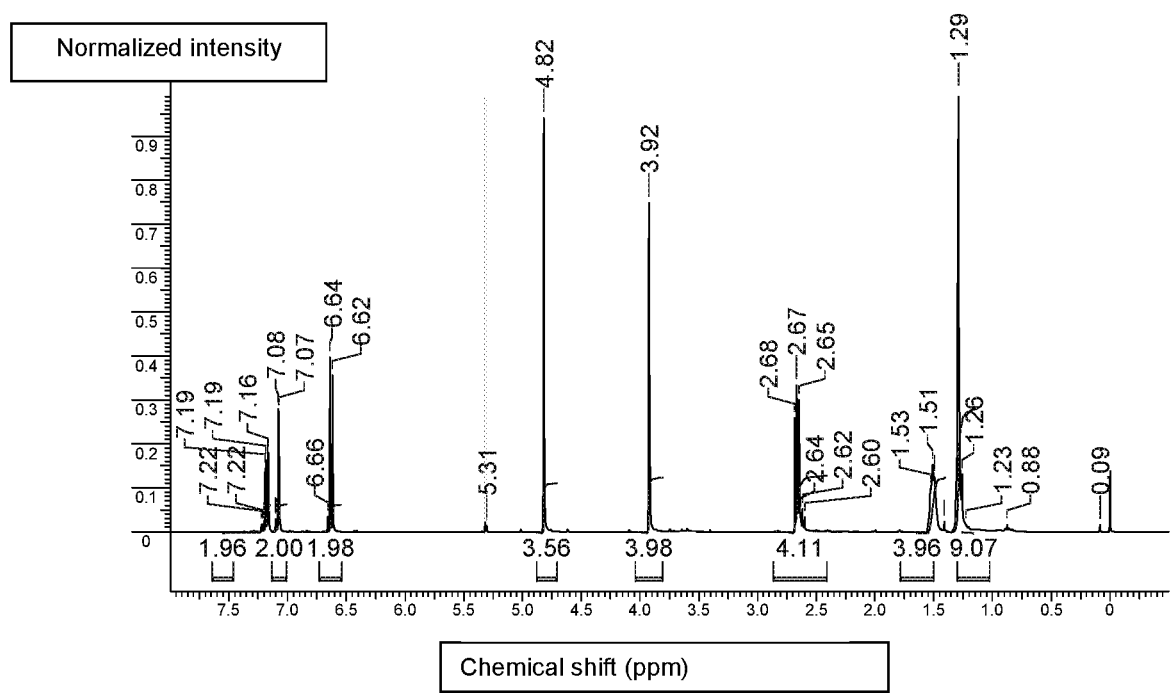

The $^1$H NMR spectrum (500 MHz) of the Monomer M-8 thus synthesized, dissolved in $CD_2Cl_2$, is reproduced in the appended FIG. 16. This NMR analysis gives the following results:

$^1$H MMR (500 MHz) $CD_2Cl_2$: 1.29 (m, 8H), 1.51 (m, 4H), 2.67 (m, 4H), 3.92 (s, 4H), 4.82 (s, 4 H), 6-62-6-64-(d, 2H), 7.08 (s, 2H), 7.17-7.19 (d, 2H).

5.2. Synthesis of a Polybenzoxazine (Polymer P-4)

This synthesis is carried out according to the procedure depicted in the FIG. 17, as described in detail below, starting from two monomers: the benzoxazine obtained in the preceding step (Monomer M-8) and the sulfur-containing aromatic diol of formula (B-1) (4,4'-thiodiphenol; Monomer N-1) already described in FIG. 10; this being in the presence of sodium carbonate ($Na_2CO_3$; Sigma Aldrich product 13418), and the (anhydrous) solvents DMA (N,N-dimethylacetamide; Sigma Aldrich product 38839) and toluene (Acros Organics product No. 364411000). The two monomers (M-8 and N-1) are dried beforehand under vacuum at 50° C. overnight, and likewise for the sodium carbonate but at a temperature of 150° C.

The synthesis is carried out in a 100-ml four-neck round-bottomed flask, equipped with a nitrogen inlet, a thermometer, a magnetic stirrer and a Dean-Stark separator surmounted by a condenser and by a distillation bridge (provided with a heating mantle). The apparatus is dried under vacuum using a hot air gun until the thermometer reaches a temperature of at least 100° C. in the reaction flask. Everything is left to cool to ambient temperature (20° C.), then the apparatus is placed under a stream of nitrogen throughout the synthesis.

Firstly the Monomer M-8 (1 eq, 1.5 g, i.e. 2.79 mmol) of formula (A-8), and next the Monomer N-1 of formula (B-1) (1 eq, 0.61 g, i.e. 2.79 mmol) are then introduced into the round-bottomed flask. Added next are 20 ml of DMA (solvent of both monomers), then, as base, Na$_2$CO$_3$ (3 eq, 0.89 g, i.e. 8.36 mol) in suspension in 4 ml of toluene. Everything is purged under N$_2$ for 5 min, then the reaction medium is heated to 105° C. Once this temperature is reached (heating mantle temperature of around 115° C.), the distillation bridge of the Dean-Stark apparatus is heated to 110° C. (with the heating mantle) in order to facilitate the azeotropic distillation (water/toluene distillation) carried out for around 90 min. Next, the temperature of the reaction medium is gradually increased, in steps of 10° C. every 30 min, until it reaches 130° C. It is left at this temperature overnight (12 h), then it is left to cool to ambient temperature (20° C.). The reaction mixture is finally poured into 250 ml of distilled water, with vigorous (magnetic bar) stirring; it is left stirring for 30 min (20° C.), then the precipitate thus obtained is isolated by filtration (Büchner funnel) and washed with 100 ml of distilled water; during this washing, in order to extract the carbonate, acid (10% aq. HCl) is added dropwise until a neutral pH is reached. The precipitate is once again washed with 100 ml of distilled water, dried under vacuum at 80° C. overnight (around 12 h).

Figure 17:
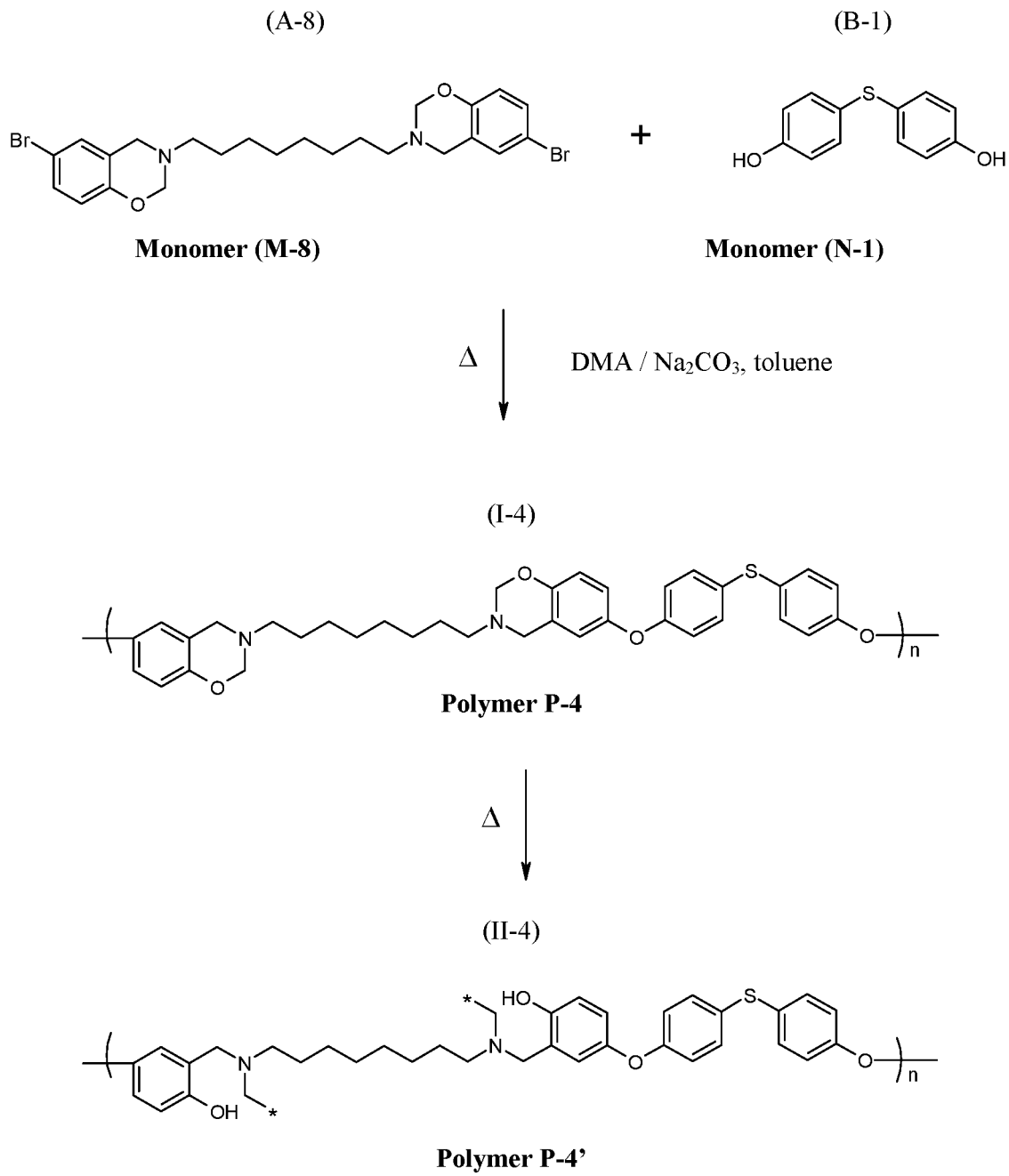

The Polymer P-4 from FIG. 17 was thus obtained, as attested to by the $^1$H NMR (500 MHz) analysis in the solvent DMA-d6, which gave the following results:

7.36-7.38 (d, 2H), 7.21-7.33 (m, 2H), 7.11-7.16 (m, 5H), 6.99-7.0 (s, 2H) 6.8-6.82 (d, 1H), 6.62 (s, 1H), 6.78-6.80 (d, 1H), 4.24 (s, 4H), 3.55-3.80 (m, 4H), 2.07-2.14 (m, 4H), 1.08-1.40 (m, 12H).

This Polymer P-4, in the form of a beige-coloured powder, was also analyzed by DSC (Differential Scanning Calorimetry) between −80° C. and +260° C. with a ramp of 10° C./min (Mettler Toledo DSC "822-2" apparatus; nitrogen atmosphere). The analysis showed, in the first pass (between −80° C. and +260° C.) an exothermicity (corresponding to the opening of the oxazine rings, and to the crosslinking of the polymer) above 200° C., with a maximum at 240° C. During the second and third DSC passes conducted between −80° C. and +260° C., no apparent glass transition (Tg) was visible, which attests to the very high thermal stability of the polymer suitable for the invention.

5.3. Test of Adhesion in a Metal/Rubber Composite

A portion (650 mg) of the Polymer P-4 previously prepared was dissolved in 8 ml of a toluene/DTP (1,3-dimethyl-3,4,5,6-tetrahydro-2(1H)-pyrimidinone; CAS 7226-23-5) mixture (in a 10:1 volume ratio), in order to form a slightly yellow transparent solution, a fraction (0.7 ml) of which was then deposited uniformly on a brass reinforcer (tape) having dimensions of 10 cm×2.5 cm and a thickness of 0.3 mm; the assembly was placed in an oven at 175° C. (with air ventilation) for 5 min, then an additional 5 min at 230° C. under vacuum in order, on the one hand, to eliminate any trace of solvent and, on the other hand, to at least partially open (i.e. completely or partially open) the oxazine rings of the polymer, this last step being accompanied by a pronounced change in the colour of the polymer, which changes to bright yellow.

After cooling to ambient temperature, the reinforcer of the invention provided at the surface with its thin (5 to 10 μm thick) layer of polybenzoxazine thus formed, was then subjected to a conventional two-step adhesive coating operation (two bath adhesive coating), firstly by immersion in a first aqueous bath (around 94% water) based on epoxy resin (polyglycerol polyglycidyl ether, around 1%) and on isocyanate compound (caprolactam-blocked isocyanate compound, around 5%), which first adhesive coating step is followed by drying (2 min at 100° C.) then a heat treatment (5 min at 200° C.). Next, the reinforcer thus treated was immersed in a second aqueous bath of RFL adhesive (around 81% by weight of water) based on resorcinol (around 2%), on formol (around 1%) and on a rubber latex (around 16% of NR, SBR and VP-SBR rubbers); finally it was dried in an oven for 2 min at 130° C., then heat treated for 5 min at 200° C.

The brass reinforcer thus coated with the polybenzoxazine film then coated with adhesive, was subsequently placed between two layers of conventional rubber composition for a belt reinforcement of a passenger vehicle tyre, based on natural rubber, on carbon black and silica as filler and on a vulcanization system (sulfur and sulfenamide accelerator); this composition being devoid of cobalt salt. The metal/rubber composite test specimen thus prepared was then placed under a press and everything was cured (vulcanized) at 165° C. for 15 min under a pressure of 20 bar.

After vulcanization of the rubber, excellent adhesive bonding between the rubber matrix and metal reinforcer was obtained, despite the absence of cobalt salt in the rubber matrix; this is because, during peel tests (at 20° C.), it was found that the failure occurred systematically in the rubber matrix itself and not at the interface between metal and rubber.

Other adhesive bonding tests were carried out on a(n) (uncoated) bright steel tape; they too revealed an excellent adhesion to the rubber (systematic failure in the rubber matrix).

In conclusion, the specific polybenzoxazine described in detail in the present application offers the metal reinforcers of the invention the major advantage of being able subsequently to be adhesively bonded to rubber matrices using simple textile adhesives, such as RFL adhesives, or else directly (that is to say, without employing such adhesives) to these rubber matrices, for example when the latter contain appropriate functionalized unsaturated elastomers, such as epoxidized elastomers.

Thus, use may be made of metal reinforcers optionally coated with adhesive metal layers such as brass, and also surrounding rubber matrices devoid of metal salts, in particular of cobalt salts.

Moreover, this constituting a significant advantage compared to the other known polymers described in the introduction to the present document, polybenzoxazines suitable for the reinforcers of the invention have the remarkable ability, at high temperature, to open their oxazine rings and to thus result in a thermosetting polyphenolic resin structure. This gives them a better thermal stability, with no visible phase transition at temperatures above 200° C. Lastly, their specific microstructure makes it possible, very advantageously, to adjust the flexibility of the molecule depending on the particular applications targeted.

The invention claimed is:

1. A metal or metallized reinforcer, at least the surface of which is at least partially metallic, wherein at least said metallic part is coated with a polybenzoxazine, the repeat units of which comprise at least one unit corresponding to formula (I) or (II):

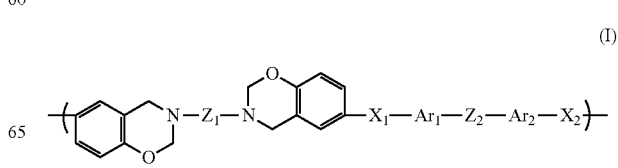

-continued

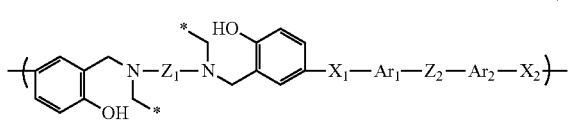
(II)

in which:
- $Z_1$ represents an at least divalent, aliphatic, cycloaliphatic or aromatic bonding group comprising at least one carbon atom and optionally at least one heteroatom selected from O, S, N and P;
- $X_1$ and $X_2$, which are identical or different, represent O or S;
- $Ar_1$ and $Ar_2$, which are identical or different, represent a substituted or unsubstituted phenylene group; and
- $Z_2$ represents O or $(S)_n$, n representing an integer equal to 1 or greater than 1.

2. The metal or metallized reinforcer according to claim 1, wherein $Z_1$ represents an aliphatic group comprising from 1 to 20 carbon atoms or a cycloaliphatic group comprising from 3 to 20 carbon atoms.

3. The metal or metallized reinforcer according to claim 2, wherein $Z_1$ represents an aliphatic group comprising from 1 to 16 carbon atoms or a cycloaliphatic group comprising from 3 to 16 carbon atoms.

4. The metal or metallized reinforcer according to claim 2, wherein $Z_1$ represents a $C_1$-$C_{20}$ alkylene group.

5. The metal or metallized reinforcer according to claim 2, wherein $Z_1$ represents a $C_1$-$C_{16}$ alkylene group.

6. The metal or metallized reinforcer according to claim 1, wherein $Z_1$ represents an aromatic group comprising from 6 to 30 carbon atoms.

7. The metal or metallized reinforcer according to claim 6, wherein $Z_1$ represents an aromatic group comprising from 6 to 20 carbon atoms.

8. The metal or metallized reinforcer according to claim 1, wherein $Ar_1$ and $Ar_2$ each represent an unsubstituted benzene ring.

9. The metal or metallized reinforcer according to claim 1, wherein $X_1$ and $X_2$ each represent S.

10. The metal or metallized reinforcer according to claim 9, wherein $Z_2$ represents O or S.

11. The metal or metallized reinforcer according to claim 10, wherein $Z_2$ represents S.

12. The metal or metallized reinforcer according to claim 1, wherein $X_1$ and $X_2$ each represent O.

13. The metal or metallized reinforcer according to claim 12, wherein $Z_2$ represents O or S.

14. The metal or metallized reinforcer according to claim 13, wherein $Z_2$ represents S.

15. The metal or metallized reinforcer according to claim 13, wherein the repeat units comprise at least one unit corresponding to formulae (I-1) or (II-1):

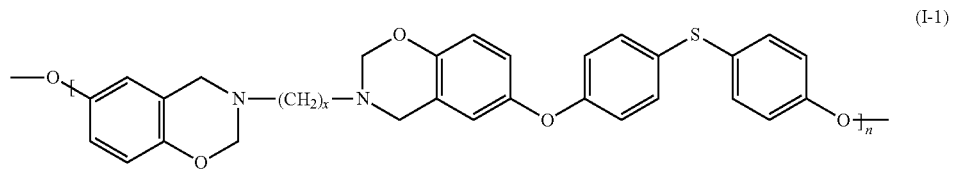
(I-1)

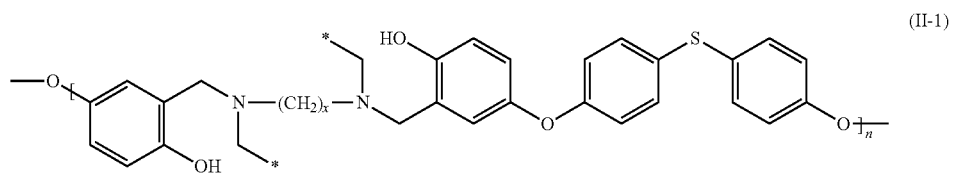
(II-1)

in which:
- x is an integer varying from 1 to 16.

16. The metal or metallized reinforcer according to claim 15, wherein x is an integer varying from 1 to 12.

17. The metal or metallized reinforcer according to claim 12, wherein the repeat units comprise at least one unit corresponding to formulae (I-1) or (II-1):

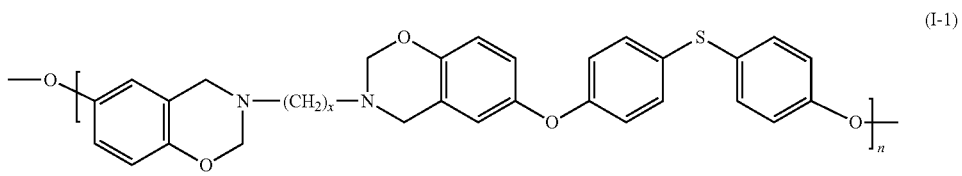
(I-1)

-continued

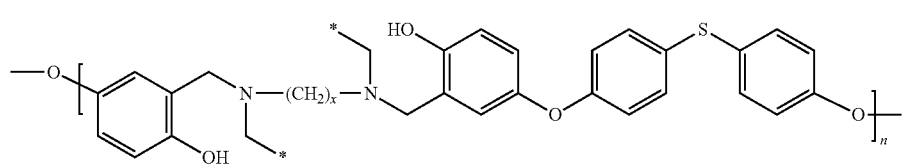

(II-1)

in which:
x is an integer varying from 1 to 16.

18. The metal or metallized reinforcer according to claim 17, wherein x is an integer varying from 1 to 12.

19. The metal or metallized reinforcer according to claim 1, wherein the metal or metallized reinforcer is in the form of a wire, film, tape or cord made of carbon steel.

20. The metal or metallized reinforcer according to claim 19, wherein the carbon steel is a bright steel.

21. The metal or metallized reinforcer according to claim 19, wherein the carbon steel is at least partially coated with at least one layer of a surface metal selected from the group consisting of aluminum, copper, zinc and alloys thereof.

22. The metal or metallized reinforcer according to claim 21, wherein the surface metal is brass.

23. A rubber article reinforced with the metal or metallized reinforcer according to claim 1.

24. The rubber article according to claim 23, wherein the rubber article is a pneumatic or non-pneumatic motor vehicle tire.

* * * * *